United States Patent
Kita et al.

(10) Patent No.: US 6,806,818 B2
(45) Date of Patent: *Oct. 19, 2004

(54) APPARATUS AND METHOD FOR DIGITAL STREAM CONVERSION

(75) Inventors: Kouichi Kita, Nagoya (JP); Shouichi Gotoh, Ibaraki (JP); Mikihiko Yamada, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/612,003

(22) Filed: Jul. 3, 2003

(65) Prior Publication Data

US 2004/0004562 A1 Jan. 8, 2004

(30) Foreign Application Priority Data

Jul. 4, 2002 (JP) ........................................ 2002-195503

(51) Int. Cl.[7] .............................................. H03M 7/30
(52) U.S. Cl. ........................................ 341/87; 348/441
(58) Field of Search .......................... 341/87, 441, 426; 370/395.64

(56) References Cited

U.S. PATENT DOCUMENTS 5,801,781 A * 9/1998 Hiroshima et al. ......... 348/441
6,567,409 B1 * 5/2003 Tozaki et al. ........... 370/395.64

FOREIGN PATENT DOCUMENTS

JP        11-205789        7/1999

* cited by examiner

Primary Examiner—Jean Bruner Jeanglaude
(74) Attorney, Agent, or Firm—Wenderoth, Lind & Ponack, L.L.P.

(57) ABSTRACT

A stream conversion apparatus 10 receives an MPEG2 transport stream as an input stream 21. To each packet contained in this stream, a time stamp assignment section 11 assigns the input time of that packet as a time stamp. A packet reduction section 12 deletes NULL packets which appear in the stream with a predetermined repetition pattern. Based on a proportions of the NULL packet in the stream, a time stamp replacement section 13 replaces the time stamp assigned to the packets which have not been deleted by the packet reduction section 12. The packets which have under gone the selective time stamp replacement are temporarily stored in the buffer 14, and outputted by the packet reading section 15 and the output section 16, such that each packet is outputted at a time indicated by the time stamp assigned to that packet.

12 Claims, 13 Drawing Sheets

APPARATUS AND METHOD FOR DIGITAL STREAM CONVERSION

BACKGROUND OF THE INVENTION

1. Field of the Invention

The present invention relates to an apparatus and method for digital stream conversion, and more particularly to an apparatus and method for digital stream conversion which outputs a digital stream having a packetized format at a rate which is slower than the input rate.

2. Description of the Background Art

Processing of various kinds of digital streams, e.g., a transport stream compliant with the MPEG2 (Moving Picture Experts Group 2) standard, may sometimes involve a process which purposely outputs an input digital stream at a slower rate than the rate at which the digital stream is inputted. Hereinafter, such a rate conversion process for a digital stream and an accompanying process of altering a portion of the data contained in the digital stream will together be referred to as a "stream conversion process". Furthermore, an apparatus which performs a stream conversion process will be referred to as a "stream conversion apparatus".

An example of a conventional stream conversion apparatus is an MPEG2 transport stream transfer rate conversion apparatus described in Japanese Patent Laid-Open Publication No. 11-205789 (see FIG. 13). This apparatus receives, as an input stream 91, an MPEG2 transport stream containing packets of a predetermined length. An MPEG2 transport stream typically includes packets which only contain invalid data (hereinafter referred to as "NULL packets") and packets which contain program clock references (hereinafter referred to as "PCRs") as defined under the MPEG2 system standard. A packet identifier for identifying the type of the packet is assigned to each packet in the input stream 91.

The input stream 91 is inputted to a synchronization detection section 81. The synchronization detection section 81 detects synchronization of the input stream 91. Based on the packet identifier assigned to each inputted packet, a packet identification section 82 identifies the packet. More specifically, the packet identification section 82 deletes any NULL packets contained in the input stream 91, and writes any other packets (herein after referred to as "non-NULL packets") to a buffer 89. The buffer 89 temporarily stores non-NULL packets.

Each time a non-NULL packet is outputted from the packet identification section 82, a PCR extraction section 83 generates a write control signal 92 for the buffer 89, and extracts a PCR 93, if any, from the non-NULL packet. Based on the PCR 93 extracted by the PCR extraction section 83, a PLL (Phase Locked Loop) circuit 84 generates a 27 MHz system clock, and outputs the PCR 94 obtained after the PLL (hereinafter referred to as a "post-PLL PCR") to a PCR replacement section 87.

A packet reading section 85 reads the packets stored in the buffer 89, in synchronization with an externally-supplied output timing signal 95. Among the packets which have been read, packets containing no PCRs are fed to an output section 88, whereas packets containing PCRs are fed to the PCR replacement section 87. The PCR replacement section 87 replaces the PCR contained in each packet which has been read from the buffer 89 with the post-PLL PCR 94 outputted from the PLL circuit 84, and feeds the packets thus processed to the output section 88. A NULL packet generation section 86 generates NULL packets in accordance with a control signal 96 outputted from the packet reading section 85.

The output section 88 outputs the packets which have been read from the buffer 89 (including those which have been processed through the PCR replacement section 87) and the NULL packets generated by the NULL packet generation section 86 to outside of the apparatus, as an output stream 97.

The reason why the apparatus shown in FIG. 13 comprises the NULL packet generation section 86 is in order to guarantee continuity of the output stream 97. For example, if an abnormality occurs in the input stream 91, packets in the buffer 89 may be depleted, thereby rendering the output stream 97 discontinuous. Even if packets are thus depleted, the apparatus shown in FIG. 13 can generate NULL packets as necessary, which are then outputted as the output stream 97. As a result, continuity of the output stream 97 is guaranteed.

However, the above-described conventional stream conversion apparatus has the following problems. Firstly, the conventional stream conversion apparatus performs PCR replacement by employing a PLL circuit and a PCR replacement section. Therefore, a PLL circuit is indispensable to the conventional stream conversion apparatus. Moreover, the operation of such a PLL circuit may become unstable depending on the PCR extraction timing in the PCR extraction section, e.g., when the PCRs contained in packets become discontinuous. Once the operation of the PLL circuit becomes unstable, the PCR replacement may become erroneous, thereby hindering the proper output of the output stream. Furthermore, in the case where a plurality of sequences of PCRs are contained in the input stream, PCR replacement may not be properly performed.

SUMMARY OF THE INVENTION

Therefore, an object of the present invention is to provide an apparatus and method for stream conversion which solves the aforementioned problems associated with conventional stream conversion apparatuses.

The present invention has the following features to attain the object mentioned above.

A first aspect of the present invention is directed to a digital stream conversion apparatus for outputting a digital stream having a packetized format at a rate which is slower than an input rate, comprising: a time stamp assignment section for assigning, as a time stamp for each packet in an inputted digital stream comprising a plurality of packets, an input time of the packet; a packet reduction section for deleting deletable packets from the inputted digital stream and outputting remaining packets, wherein the deletable packets are packets which appear in the digital stream with a predetermined repetition pattern; a time stamp replacement section for, based on a proportion of the deletable packets in the digital stream, replacing the time stamps assigned to the packets outputted from the packet reduction section; and a packet output section for outputting the packets outputted from the time stamp replacement section, such that each packet is outputted at a time indicated by the time stamp assigned to the packet. Thus, without employing any circuit such as a PLL circuit, precise stream conversion processes can be performed in a stable manner. By incorporating such a stream conversion apparatus between a main bus and an interface circuit of an information device or a video device, for example, it becomes possible to utilize the main bus effectively and efficiently.

Until positions of the deletable packets among the packets outputted from the time stamp assignment section are ascertained, the packet reduction section may be operable to: if a packet of the same type as the deletable packets is inputted following immediately after a packet of a different type from the type of the deletable packets, delete the packet; and if packets of the same type as the deletable packets are consecutively inputted, delete any packet in an odd-numbered position among the consecutive packets and output any packet in an even-numbered position among the consecutive packets. This prevents all of the same type of packets as the deletable packets from being indiscriminately deleted from the output stream before the positions of the deletable packets are ascertained.

Alternatively, once the positions of the deletable packets among the packets outputted from the time stamp assignment section are ascertained, the packet reduction section may be operable to delete any packets which are in the ascertained positions, and output the remaining packets in the inputted digital stream, regardless of whether the remaining packets are of the same type as the deletable packets or not. This prevents all of the same type of packets as the deletable packets from being indiscriminately deleted from the output stream after the positions of the deletable packets are ascertained.

In one embodiment, the deletable packets account for a proportion $\alpha$ of all the packets in the inputted digital stream (where $0<\alpha<1$), and the time stamp replacement section does not perform time stamp replacement for any packet following immediately after a deletable packet, but performs time stamp replacement for any other packet so that a difference between the time stamp assigned to the packet and the time stamp assigned to an immediately previous packet is $\beta$ times as large as that before the time stamp replacement (where $1<\beta<1/(1-\alpha)$). As a result, the output periods of no two packets overlap with each other (i.e., no two packets are being outputted at any given moment). Thus, by outputting the packet having undergone the time stamp replacements such that each packet is outputted at a time indicated by the time stamp assigned to that packet, a proper output stream can be obtained.

In another embodiment, the time stamp assignment section and the packet output section each use a count value of pulses of a clock signal having a predetermined frequency as a reference of time. Thus, the time values to be used in the time stamp assignment section and the packet output section can be easily obtained.

In still another embodiment, the digital stream is a transport stream compliant with the MPEG2 system standard, and the packet reduction section regards null packets which appear in the transport stream with a predetermined repetition pattern as the deletable packets. Thus, the stream conversion process can be performed with respect to a an MPEG2 transport stream.

More preferably, the time stamp assignment section and the packet output section each use, as a reference of time, a count value which is updated with a frequency of 27 MHz, and if any packet outputted from the packet reduction section contains a program clock reference, the time stamp replacement section adds to the program clock reference contained in the packet a difference between the time stamp assigned to the packet before the time stamp replacement and that assigned after the time stamp replacement. Thus, it is unnecessary to employ a special PCR replacement circuit, which was a necessity in a conventional stream conversion apparatus. Since the PCR replacements performed by the time stamp replacement section are based on the values derived for the time stamp replacements, the PCR replacements can be realized through simple calculations. Furthermore, since PCRs are updated through digital calculations, various problems are forestalled, e.g., errors occurring during the execution of the calculations, inability to continue calculations due to instability of the circuitry, or calculation errors.

The digital stream may be a stream obtained by demodulating an analog signal which has been modulated by a QPSK scheme with a code ratio selected from the group consisting of 7/8, 5/6, 3/4, 2/3, and 1/2. Alternatively, the digital stream may be a stream obtained by demodulating an analog signal which has been modulated by a BPSK scheme with a code ratio of 1/2. Thus, invalid data can be eliminated from a digital stream which is based on a digital television broadcast signal, thereby reducing the data amount in the digital stream.

A second aspect of the present invention is directed to a digital stream conversion method for outputting a digital stream having a packetized format at a rate which is slower than an input rate, comprising: a time stamp assignment step of assigning, as a time stamp for each packet in an inputted digital stream comprising a plurality of packets, an input time of the packet; a packet reduction step of deleting deletable packets from the inputted digital stream, wherein the deletable packets are packets which appear in the digital stream with a predetermined repetition pattern; a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet. Thus, without employing any circuit such as a PLL circuit, precise stream conversion processes can be performed in a stable manner. By incorporating such a stream conversion apparatus between a main bus and an interface circuit of an information device or a video device, for example, it becomes possible to utilize the main bus effectively and efficiently.

A third aspect of the present invention is directed to a program for causing a computer to execute a digital stream conversion method for outputting a digital stream having a packetized format at a rate which is slower than an input rate, the method comprising: a time stamp assignment step of assigning, as a time stamp for each packet in an inputted digital stream comprising a plurality of packets, an input time of the packet; a packet reduction step of deleting deletable packets from the inputted digital stream, wherein the deletable packets are packets which appear in the digital stream with a predetermined repetition pattern; a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet. A fourth aspect of the present invention is directed to a computer-readable recording medium having recorded thereon a program for causing a computer to execute a digital stream conversion method for outputting a digital stream having a packetized format at a rate which is slower than an input rate, the method comprising: a time stamp assignment step of assigning, as a time stamp for each packet in an inputted digital stream comprising a plurality of packets, an input time of the packet; a packet reduction step of deleting deletable packets from the inputted digital stream, wherein the deletable packets are packets which appear in the digital stream with a predetermined repetition pattern; a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
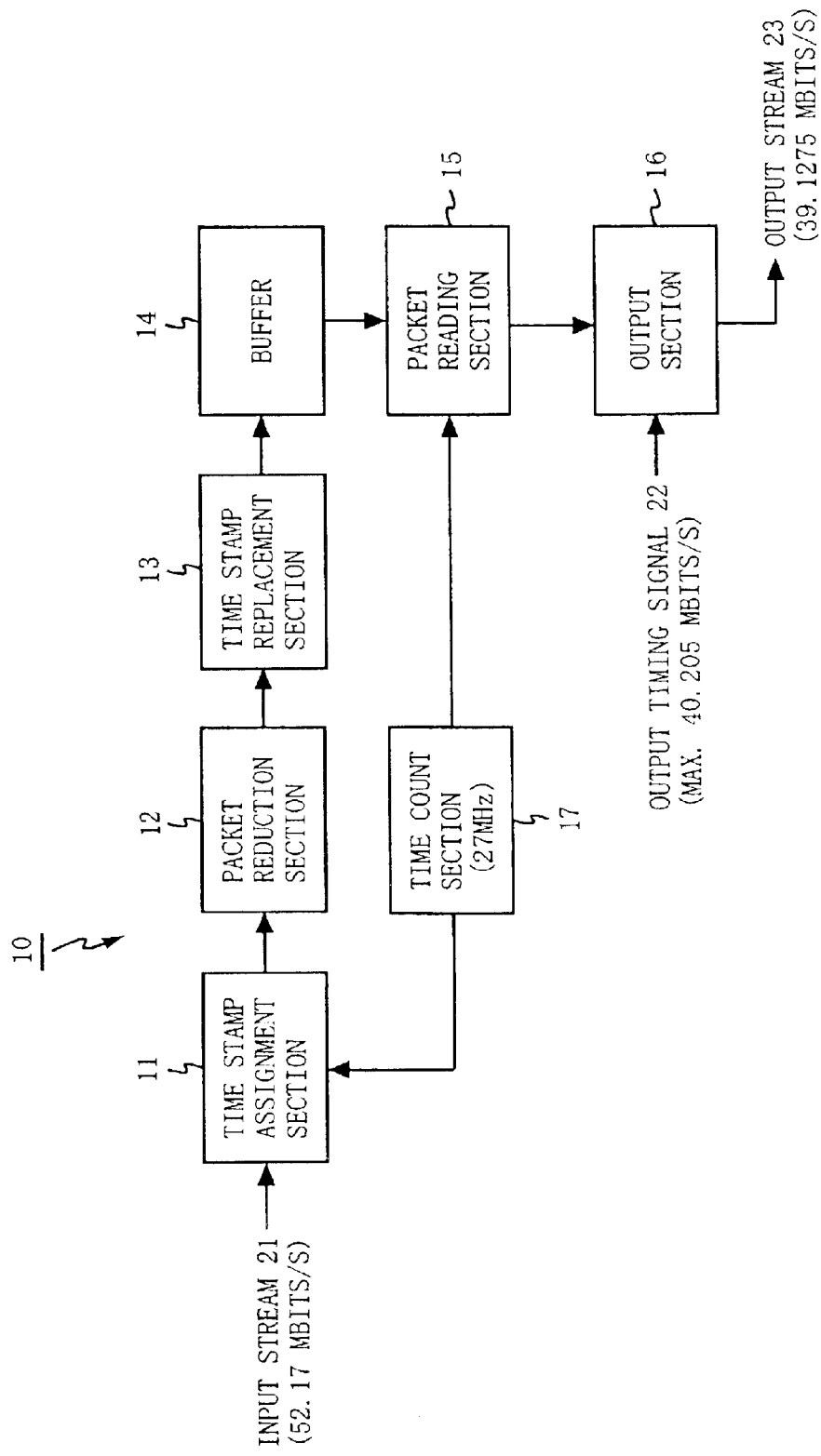
FIG. 1 is a block diagram illustrating the structure of a stream conversion apparatus according to first to fourth embodiments of the present invention.

FIG. 1 is a block diagram illustrating the structure of a stream conversion apparatus according to a first embodiment of the present invention. The stream conversion apparatus 10 shown in FIG. 1 comprises a time stamp assignment section 11, a packet reduction section 12, a time stamp replacement section 13, a buffer 14, a packet reading section 15, an output section 16, and a time count section 17. The stream conversion apparatus 10 performs a stream conversion process for outputting an input stream 21 at a slower rate than the rate at which the input stream 21 is inputted.

Figure 2:
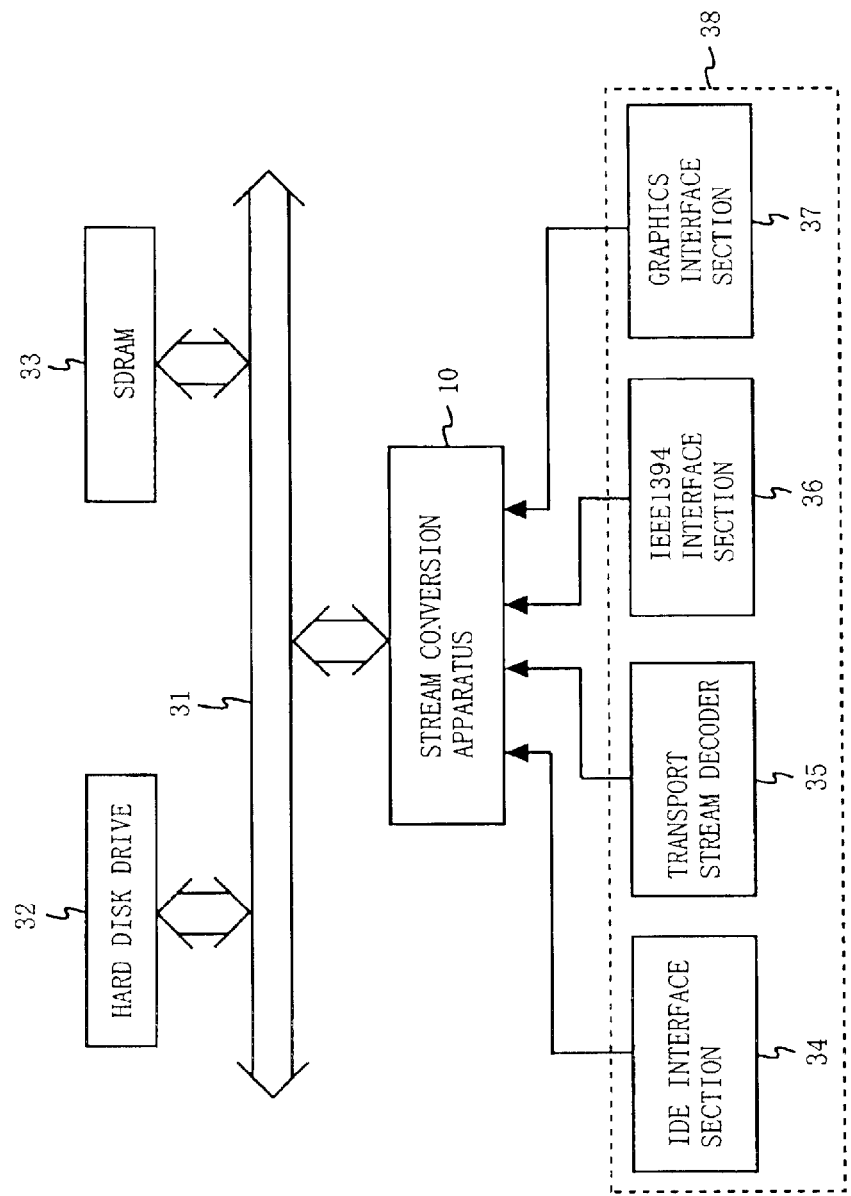
FIG. 2 is a block diagram illustrating the structure of a video device incorporating the stream conversion apparatus shown in FIG. 1.

Prior to any detailed description of the component elements of the stream conversion apparatus 10, an exemplary manner of using the stream conversion apparatus 10 will be described with reference to FIG. 2. FIG. 2 is a block diagram illustrating a partial structure of a video device incorporating the stream conversion apparatus 10. In FIG. 2, a common bus 31 is a main bus in the video device. To the common bus 31, a hard disk drive 32, an SDRAM (Synchronous DRAM) 33, and the stream conversion apparatus 10 are coupled. To the stream conversion apparatus 10, interface circuitry 38 is coupled. The interface circuitry 38 includes an IDE (Integrated Drive Electronics) interface section 34, a transport stream decoder 35, an IEEE1394 interface section 36, a graphics interface section 37, and like elements. Thus, in the video device shown in FIG. 2, the stream conversion apparatus 10 is used while being coupled to the common bus 31 and the interface circuitry 38.

The interface circuitry 38 outputs various kinds of digital streams. Examples of streams outputted from the interface circuitry 38 include an MPEG2 transport stream, an MPEG2 video stream, a non-MPEG2 video stream, an audio stream, and a data stream. The stream outputted from the interface circuitry 38 is written to the hard disk drive 32 or the SDRAM 33 via the stream conversion apparatus 10 and the common bus 31.

Some streams outputted from the interface circuitry 38 may have a packetized format and contain invalid packets of a predetermined length. For example, if the stream outputted from the interface circuitry 38 is an MPEG2 transport stream obtained by demodulating an analog signal which has been modulated by a QPSK (Quadrature Phase Shift Keying) or BPSK (Binary Phase Shift Keying) scheme, such a stream will contain NULL packets (i.e., packets only containing invalid data) with a predetermined repetition pattern.

In the video device shown in FIG. 2, the stream conversion apparatus 10 deletes invalid packets from the stream outputted from interface circuitry 38, in order to fully utilize the transfer ability of the common bus 31 and to maximize the access speed on the common bus 31. For example, if the aforementioned MPEG2 transport stream is being outputted from the interface circuitry 38, the stream conversion apparatus 10 deletes NULL packets from this stream, and outputs the remaining packets at a slower rate than the input rate. By using the stream conversion apparatus 10 in this manner, the data amount of the digital stream outputted to the common bus 31 can be deleted, thereby substantially enlarging the transfer band on the common bus 31.

In addition to the elements shown in FIG. 2, a CPU, a DSP, a RAM, a ROM, or any other device may be coupled to the common bus 31. Similarly, any interface circuit other than those shown in FIG. 2 (e.g., devices which handle a video stream, an audio stream, a data stream, or the like) may also be coupled to the stream conversion apparatus 10.

The stream conversion apparatus 10 may perform a stream conversion process for a stream which departs from a circuit or device coupled to the common bus 31 toward the interface circuitry 38. The manner of using the stream conversion apparatus 10 is not limited to that which is illustrated in FIG. 2, and the stream conversion apparatus 10 may be employed in any manner suitable with a stream conversion process.

Referring back to FIG. 1, the stream conversion apparatus 10 will be specifically described. The input stream 21 is inputted to the stream conversion apparatus 10 at a predetermined rate. The input stream 21 is, for example, an MPEG2 transport stream obtained by demodulating an analog signal which has been modulated by a QPSK scheme with a code ratio of 3/4. With respect to a given stream containing regularly-occurring NULL packets (i.e., NULL packets which appear with a predetermined repetition pattern), a "code ratio" is defined as a proportion of any packets other than the regularly-occurring NULL packets to the total number of packets in the stream. In this MPEG2 transport stream, for an integer m which is equal to or greater than 0 and equal to or less than 3, every $(4n-m)^{th}$ packet from the beginning is a NULL packet (note that hereinafter n represents a natural number). In the present embodiment, it is conveniently assumed that the input stream 21 contains no irregular NULL packets other than the "regular" NULL packets, i.e., NULL packets which appear with a predetermined repetition pattern.

The stream conversion apparatus 10 deletes the NULL packets from the input stream 21, and outputs the stream from which the NULL packets have been deleted as an output stream 23. To this end, the component elements of the stream conversion apparatus 10 function in the following manner. In the following description, it is assumed that NULL packets which appear in the input stream 21 with a predetermined repetition pattern account for a proportion α of all the packets in the input stream 21 (where 0<α<1).

The time count section 17 outputs a count value which is updated with a predetermined frequency. The time count section 17 may be composed of, for example, a counter which counts the pulses of a clock signal having a frequency of 27 MHz. The time count section 17 outputs the count value to the time stamp assignment section 11 and the packet reading section 15. The count value is used in the time stamp assignment section 11 as a reference time for time stamps, and in the packet reading section 15 as a reference time for output timing.

The time stamp assignment section 11 assigns a time stamp to each packet contained in the input stream 21. More specifically, as a time stamp for each packet in the input stream 21, the time stamp assignment section 11 assigns the count value which is being outputted from the time count section 17 when that packet is inputted to the time stamp assignment section 11.

Since the packets are consecutively inputted to the time stamp assignment section 11, time stamps of different values are to be assigned to the respective packets. Now, a differences Δ TS between time stamps assigned to two consecutive packets is given by eq. (1):

$$\Delta TS = CF \times PL/Sin \qquad (1)$$

In eq. (1), CF represents the frequency with which the count value is updated by the time count section 17; PL represents the length of each packet contained in the input stream 21; and Sin represents the input rate of the input stream 21.

From among the packets outputted from the time stamp assignment section 11, the packet reduction section 12 deletes any NULL packets appearing in the input stream 21 with a predetermined repetition pattern, and outputs the remaining packets (which are always non-NULL packets in the present embodiment). Since the packet reduction section 12 deletes the NULL packets accounting for a proportion α of the input stream 21 (where 0<α<1), the packet reduction section 12 outputs (1−α) times as many packets as there are in the input stream 21.

Based on the proportion α, the time stamp replacement section 13 replaces the time stamps assigned to the packets which are outputted from the packet reduction section 12. Since a portion of the packets contained in the input stream 21 are deleted by the packet reduction section 12 in the aforementioned manner, the output stream 23 only needs to contain fewer packets than in the input stream 21 in a given unit time. Accordingly, the time stamp replacement section 13 performs a process of enlarging the difference between the time stamps assigned to two consecutive packets, as described below.

Specifically, the time stamp replacement section 13 does not replace the time stamp of any packet following immediately after a deleted packet, but replaces the time stamp of any other packet so that the difference between that time stamp and the time stamp assigned to an immediately previous packet is β times as large as that before the replacement (where 1<β<1/(1−α)). In other words, the time stamp replacement section 13 does not replace the time stamp of any packet following immediately after a NULL packet. On the other hand, the time stamp replacement section 13 replaces the time stamp assigned to any packet following immediately after a non-NULL packet with a value TSnew which is calculated in accordance with eq. (2):

$$TSnew = TSprev + \Delta TS \times \beta \qquad (2)$$

In eq. (2), TSprev represents the post-replacement value of the time stamp assigned to a packet lying immediately previous to the packet to be processed; ΔTS represents the value which has been calculated in accordance with eq. (1) above; and β represents a quotient of the division Sin/Sout, where Sin represents the input rate of the input stream 21, and Sout represents maximum value of the output rate of the output stream 23.

Note that any process taking place inside the stream conversion apparatus 10 requires a non-zero predetermined processing time, so that the output stream 23 is inevitably delayed with respect to the input stream 21 by a certain amount of time. Therefore, in order to ensure that the output time of the output stream 23 is delayed with respect to the input time of the input stream 21, the time stamp replacement section 13 universally adds a predetermined value TD to the time stamp assigned to any packet which is outputted from the packet reduction section 12, in addition to performing the above-described time stamp replacement process. The predetermined value TD may be selected equal to the minimum delay time which elapses after the input stream 21 is inputted and before the output stream 23 is outputted.

The buffer 14, the packet reading section 15, and the output section 16 together function as a packet output section which outputs any packet outputted from the time stamp replacement section 13 at a time indicated by the time stamp assigned to that packet. More specifically, the buffer 14 temporarily stores any packet outputted from the time stamp replacement section 13. The packet reading section 15 compares the count value supplied from the time count section 17 against the time stamp assigned to each packet stored in the buffer 14, and reads the packet out of the buffer 14 when the count value and the time stamp match. The output section 16, which receives an output timing signal 22, outputs the packet which has been read by the packet reading section 15 in synchronization with the output timing signal 22. The stream outputted from the output section 16 is the output stream 23 outputted from the stream conversion apparatus 10.

The frequency of the output timing signal 22 is chosen so that maximum value Sout of the output rate of the output stream 23 is slower than the input rate Sin of the input stream 21 and yet faster than output rate $((1-\alpha) \times Sin)$ of the stream from the packet reduction section 12. In other words, the frequency of the output timing signal 22 is determined so as to satisfy eq. (3):

$$(1-\alpha) \times Sin < Sout < Sin \qquad (3)$$

Since $Sin/Sout=\beta$, eq. (3) can be expressed as eq. (4):

$$1 < \beta < 1/(1-\alpha) \qquad (4)$$

Figure 3:
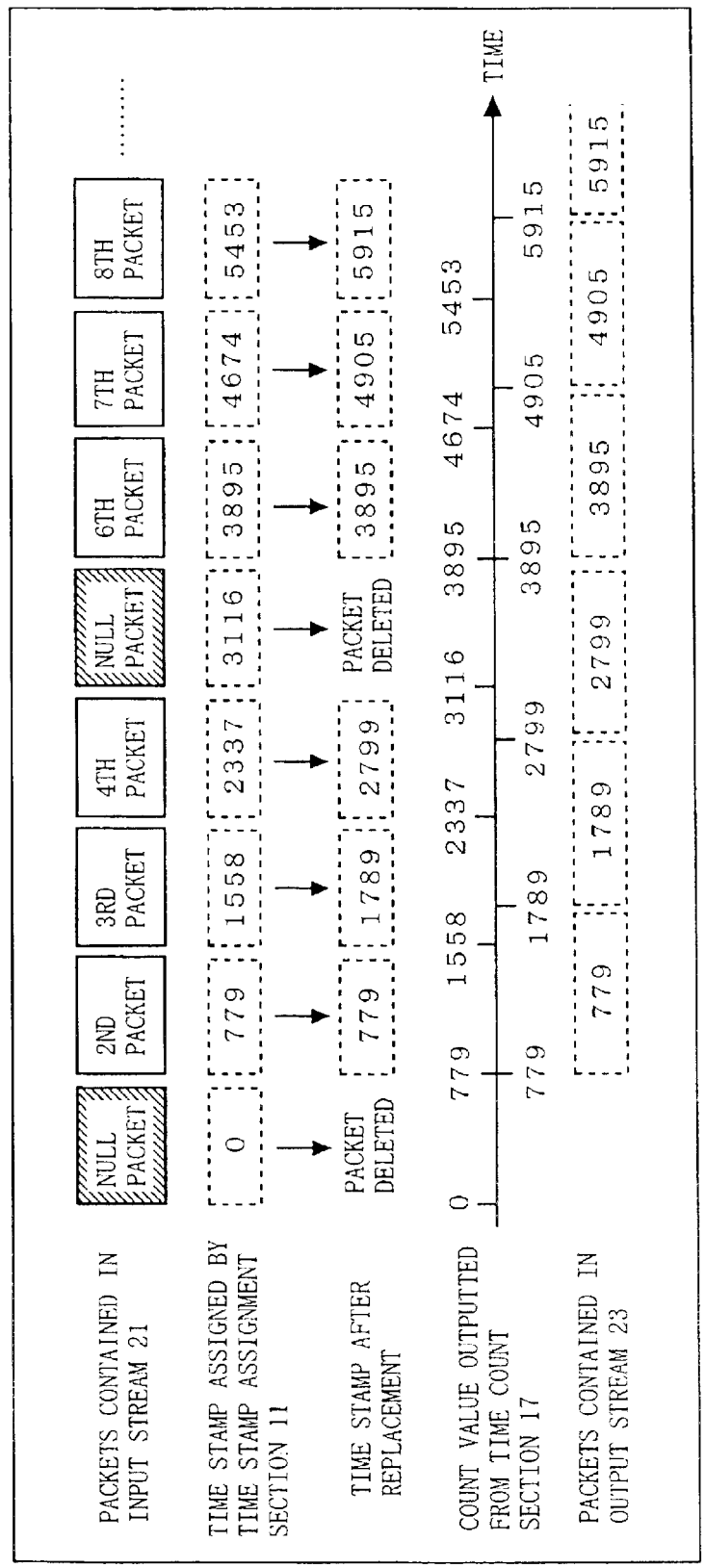
FIG. 3 is a diagram illustrating a process performed by the stream conversion apparatus according to the first embodiment of the present invention.
Figure 4:
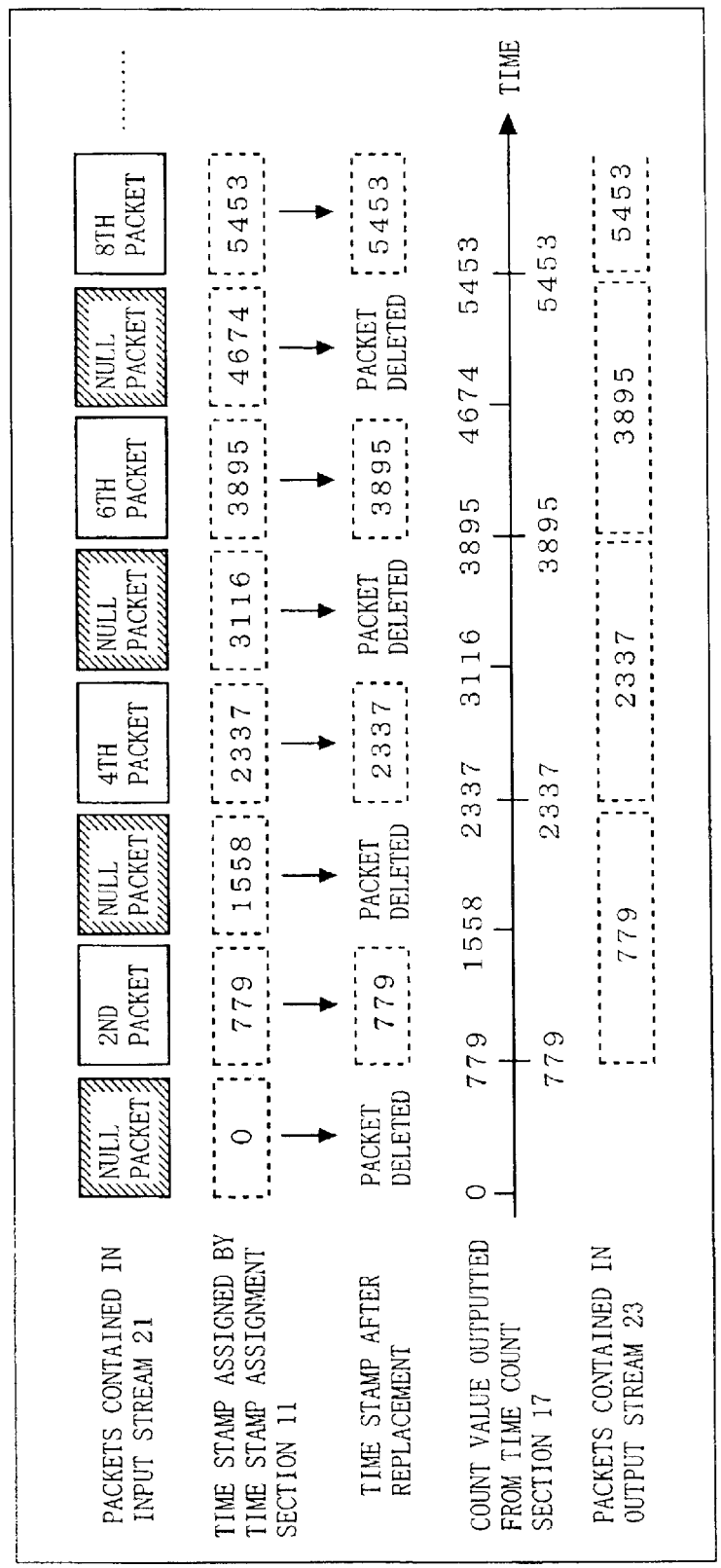
FIG. 4 is a diagram illustrating a process performed by the stream conversion apparatus according to the second embodiment of the present invention (in the case where the code ratio is 1/2)
Figure 5:
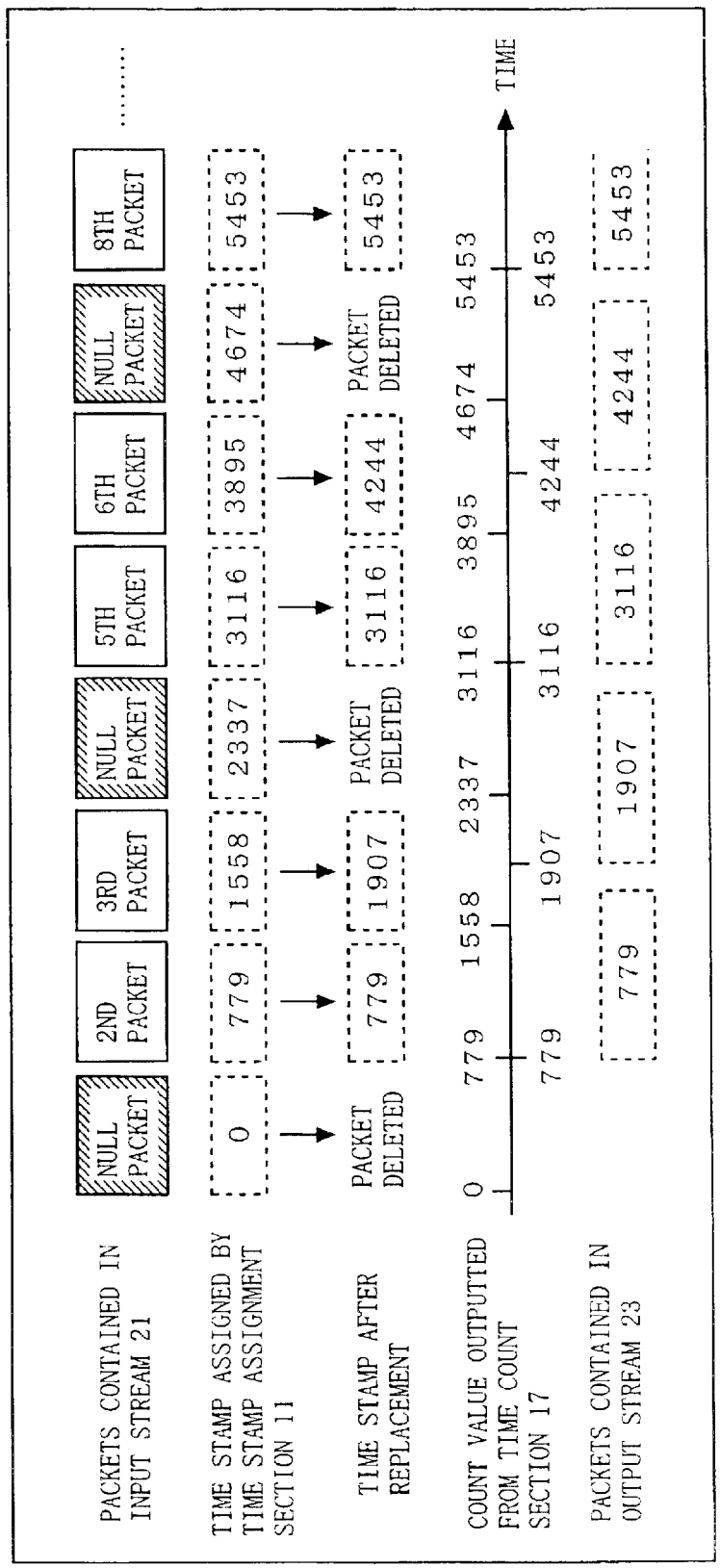
FIG. 5 is a diagram illustrating a process performed by the stream conversion apparatus according to the second embodiment of the present invention (in the case where the code ratio is 2/3)
Figure 6:
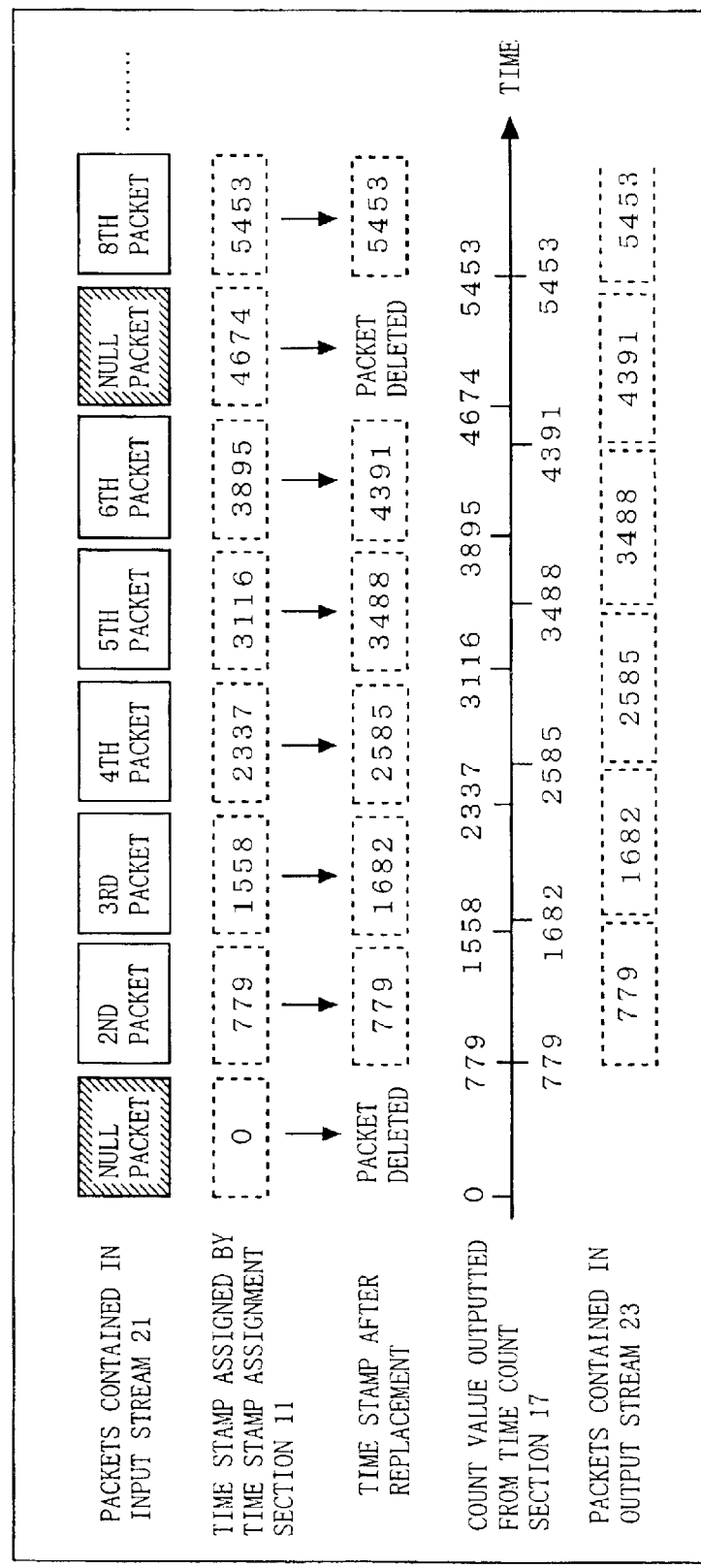
FIG. 6 is a diagram illustrating a process performed by the stream conversion apparatus according to the second embodiment of the present invention (in the case where the code ratio is 5/6)
Figure 7:
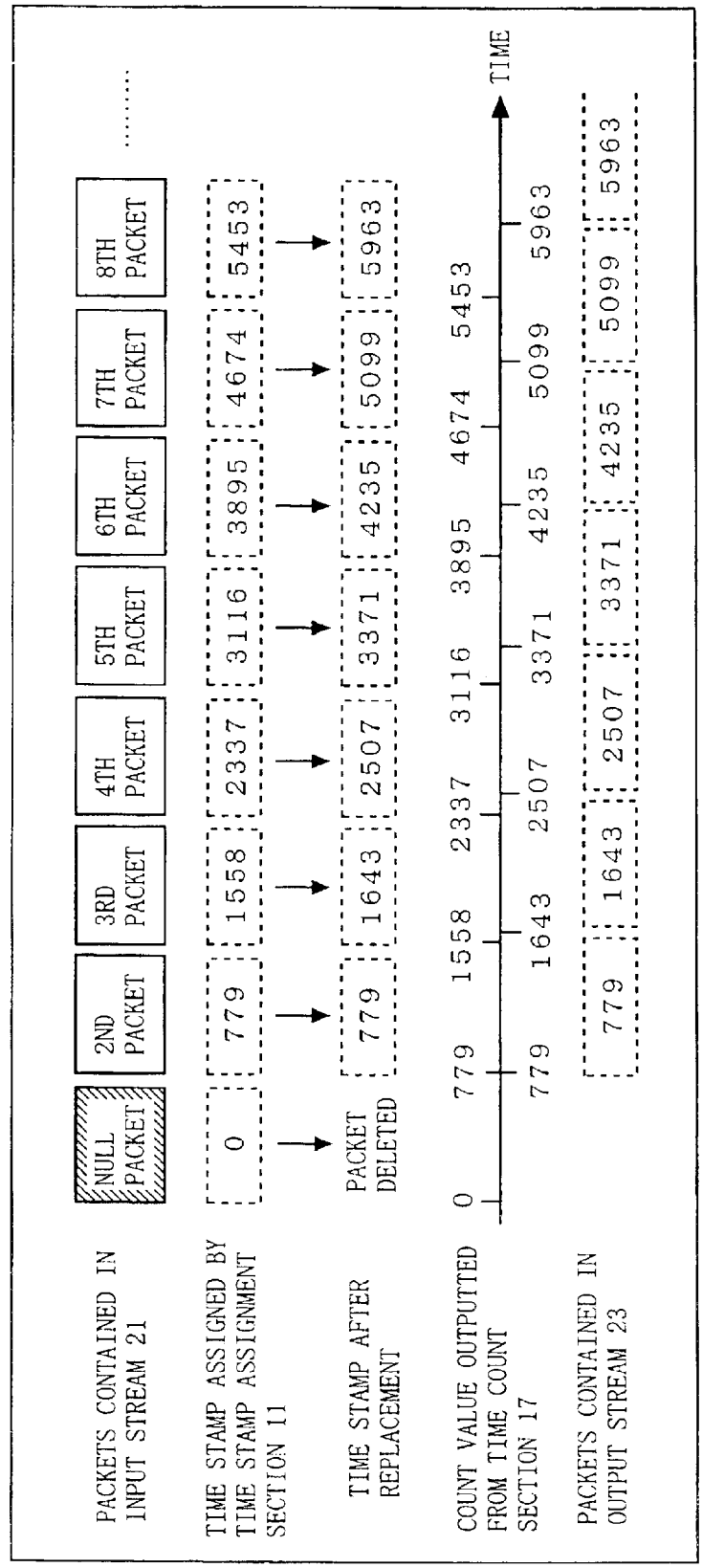
FIG. 7 is a diagram illustrating a process performed by the stream conversion apparatus according to the second embodiment of the present invention (in the case where the code ratio is 7/8)

Hereinafter, with reference to FIG. 3, a specific example process by the stream conversion apparatus 10 will be described. FIG. 3 is a diagram illustrating an exemplary process performed by the stream conversion apparatus 10. FIG. 3 illustrates a process to be performed when the stream conversion apparatus 10 operates under the following set of conditions. The input stream 21 is an MPEG2 transport stream obtained by demodulating an analog signal which has been modulated by a QPSK scheme with a code ratio of 3/4. The input stream 21 has an input rate of 52.17 Mbits/s. The output stream 23 has an output rate which is 3/4 times the input rate (i.e., 39.1275 Mbits/s). The output timing signal 22 is a clock signal such that the output rate of the output stream 23 has a maximum value of 40.205 Mbits/s. Each packet in the input stream 21 is 188 bytes long. The time count section 17 updates its count value at a frequency of 27 MHz. It is also assumed that first and fifth packets are NULL packets, and that the stream conversion apparatus 10 already knows where the NULL packets in the input stream 21 are. Furthermore, it is conveniently assumed that the time stamp replacement section 13 universally adds zero ("0") as the aforementioned predetermined value TD to the time stamp assigned to any packet which is outputted from the packet reduction section 12.

In the illustrated example, CF is 27 MHz, PL is 188 bytes (i.e., 1504 bits), and Sin is 52.17 Mbits/s. Therefore, the difference ΔTS between time stamps assigned to two consecutive packets is calculated as follows in accordance with eq. (1).

$$\Delta TS = (27 \times 10^6) \times 1504/(52.17 \times 10^6) \approx 779$$

Accordingly, the time stamp assignment section 11 assigns time stamps to the packets in the input stream 21 with an increment of "779" between any two consecutive time stamps. As a result, as shown in the second row of FIG. 2, "0", "779", "1558", "2337", "3116", "3895", "4674", and "5453" are assigned as the time stamps to the first to eighth packets, respectively.

The stream conversion apparatus 10 already recognizes that the first and fifth packets are NULL packets. Therefore, as shown in the third row of FIG. 3, the packet reduction section 12 deletes the first and fifth packets from among the first to eighth packets, and outputs the remaining six packets.

Since Sout is 40.205 Mbits/s, ΔTS×β in eq. (2) is calculated as follows:

$$\Delta TS \times \beta = \Delta TS \times Sin/Sout = 779 \times (52.17 \times 10^6)/(40.205 \times 10^6) \approx 1010$$

In the illustrated example, the first and fifth packets are NULL packets, and therefore the second and sixth packets are each a packet following immediately after a NULL packet. Accordingly, the time stamp replacement section 13 does not perform time stamp replacement for the second and sixth packets. As a result, the second and sixth packets are stored to the buffer 14 with the same time stamps ("779" and "3895") as assigned by the time stamp assignment section 11.

On the other hand, the second packet is a non-NULL packet, and therefore the third packet is not a packet following immediately after a NULL packet. Accordingly, the time stamp of the third packet is replaced by "1789", as obtained in accordance with eq. (2) by adding "1010" to the time stamp assigned to the immediately previous packet (i.e., the time stamp "779" assigned to the second packet). Similarly, the time stamps of the fourth, seventh, and eighth packets are replaced by "2799", "4905", and "5915", respectively (see the third row of FIG. 3). The packets whose time stamps have been thus replaced are stored to the buffer 14.

Each packet stored in the buffer 14 is read at a time indicated by the time stamp assigned to that packet. Since the time stamp assigned to the second packet stored in the buffer 14 is "779", the packet reading section 15 reads the second packet out of the buffer 14 when the count value outputted from the time count section 17 indicates "779", as shown in the fourth and fifth rows of FIG. 2. Thus, the second packet is read out by the packet reading section 15 as soon as it is written to the buffer 14.

On the other hand, the time stamp assigned to the third packet stored in the buffer 14 is not "1558" but "1789". Therefore, the packet reading section 15 reads the third packet out of the buffer 14 when the count value outputted from the time count section 17 indicates "1789". Thus, the third packet remains stored in the buffer 14 until the count value outputted from the time count section 17 transits from "1558" to "1789".

Receiving an output timing signal 22 such that the maximum value of the output rate of the output stream 23 equals 40.205 Mbits/s, the output section 16 outputs the packets having been read by the packet reading section 15 as the output stream 23. The packets stored in the buffer 14 have undergone the above-described selective time stamp replacement process so that the ratio of the difference between each time stamp and the time stamp assigned to an immediately previous packet to that before the replacement is greater than one and yet smaller than 4/3. Therefore, it is ensured that the output periods of no two packets stored in the buffer 14 overlap with each other (i.e., no two packets stored in the buffer 14 are being outputted at any given moment). Thus, by sequentially outputting the packets stored in the buffer 14 in synchronization with the output timing signal 22 selected as mentioned above, the output stream 23 can be properly outputted.

As described above, the stream conversion apparatus according to the present embodiment 1) assigns each packet in an input stream with a time stamp corresponding to the input time of the packet; 2) deletes any NULL packets appearing in the input stream with a predetermined repetition pattern; 3) replaces the time stamp assigned to any packet not immediately after a deleted NULL packet, based on the known proportion of the NULL packets in the input stream; and 4) outputs the packets which have undergone such selective time stamp replacements so that each packet is outputted at a time indicated by the time stamp assigned to that packet. As a result, without employing any circuit such as a PLL circuit, precise stream conversion processes can be performed in a stable manner. By incorporating such a stream conversion apparatus between a main bus and an interface circuit of an information device or a video device, for example, it becomes possible to utilize the main bus effectively and efficiently.

Second Embodiment

The second embodiment illustrates stream conversion apparatuses which perform a stream conversion process for an input stream having a different code ratio from that exemplified in the first embodiment. The present embodiment illustrates first to fourth examples of stream conversion apparatuses. The first to fourth exemplary stream conversion apparatuses each have the same structure as that of the stream conversion apparatus according to the first embodiment (see FIG. 1), and is usable in the same manner as the stream conversion apparatus according to the first embodiment (e.g., as incorporated in a video device as shown in FIG. 2). The same notes will also apply to the third and fourth embodiments described later.

The first exemplary stream conversion apparatus receives, as an input stream 21, an MPEG2 transport stream obtained by demodulating an analog signal which has been modulated by a QPSK (or BPSK) scheme with a code ratio of 1/2. The second exemplary stream conversion apparatus receives, as an input stream 21, an MPEG2 transport stream obtained by demodulating an analog signal which has been modulated by a QPSK scheme with a code ratio of 2/3. The input streams 21 which are inputted to the third and fourth exemplary stream conversion apparatuses are the same as that inputted to the second exemplary stream conversion apparatus, except that the input streams 21 inputted to the third and fourth exemplary stream conversion apparatus have code ratios of 5/6 and 7/8, respectively.

FIGS. 4 to 7 illustrate processes performed by the first to fourth exemplary stream conversion apparatuses. These processes are performed under the same set of conditions as in FIG. 3, except for the different maximum output rates of the output stream 23 and different frequencies of the output timing signals 22 being used in FIGS. 4 to 7. In the first to fourth exemplary stream conversion apparatuses, "0", "779", "1558", "2337", "3116", "3895", "4674", and "5453" areas signed as timestamps to the first to eighth packets, respectively, as in the stream conversion apparatus according to the first embodiment (see the second row of FIGS. 4 to 7).

In the first exemplary stream conversion apparatus (see FIG. 4), the input stream 21 has a code ratio of 1/2. Accordingly, in order to satisfy eq. (3), the output rate of the output stream 23 has a maximum value Sout of 28 Mbits/s. In this stream, for m=0 or 1, every $(2n-m)^{th}$ packet from the beginning is a NULL packet. It is assumed herein that the $(2n-1)^{th}$ packets (i.e., the first, third, fifth packets, etc.) are NULL packets.

In this stream conversion apparatus, the packet reduction section 12 only deletes the $(2n-1)^{th}$ packets. The time stamp replacement section 13 does not perform time stamp replacement for the $2n^{th}$ packets. Therefore, the $2n^{th}$ packets are stored to the buffer 14 with the same time stamps ("779", "2337", "3895", etc.) as assigned by the time stamp assignment section 11. Each packet stored in the buffer 14 is read out by the packet reading section 15 when the count value outputted from the time count section 17 coincides with the time stamp assigned to that packet. The output section 16 outputs the packets having been read by the packet reading section 15 in synchronization with an externally-supplied output timing signal 22.

In the second exemplary stream conversion apparatus (see FIG. 5), the input stream 21 has a code ratio of 2/3. Accordingly, in order to satisfy eq. (3), the output rate of the output stream 23 has a maximum value Sout of 36 Mbits/s. In this stream, for m=0, 1, or 2, every $(3n-m)^{th}$ packet from the beginning is a NULL packet. It is assumed herein that the $(3n-2)^{th}$ packets (i.e., the first, fourth, seventh packets, etc.) are NULL packets.

In this stream conversion apparatus, the packet reduction section 12 only deletes the $(3n-2)^{th}$ packets. The time stamp replacement section 13 does not perform time stamp replacement for the $(3n-1)^{th}$ packets. Therefore, the $(3n-1)^{th}$ packets are stored to the buffer 14 with the same time stamps ("779", "3116", "5453", etc.) as assigned by the time stamp assignment section 11.

On the other hand, the time stamp replacement section 13 performs time stamp replacement for the $3n^{th}$ packets in accordance with eq. (2). In this case, $\Delta TS \times \beta$ in eq. (2) is "1128". Therefore, the time stamp assigned to every $3n^{th}$ packet is replaced so that the difference between itself and the time stamp assigned to the immediately previous packet equals "1128". For example, the time stamp of the third packet is changed from "1558" to "1907", and the time stamp of the sixth packet is changed from "3895" to "4222". The $3n^{th}$ packets having undergone such time stamp replacements are stored to the buffer 14. Thereafter, the same processes as those performed by the first exemplary stream conversion apparatus will follow.

In the third exemplary stream conversion apparatus (see FIG. 6), the input stream 21 has a code ratio of 5/6. Accordingly, in order to satisfy eq. (3), the output rate of the output stream 23 has a maximum value Sout of 45 Mbits/s. In this stream, for an integer m which is equal to or greater than 0 and equal to or less than 5, every $(6n-m)^{th}$ packet from the beginning is a NULL packet. It is assumed herein that the $(6n-5)^{th}$ packets (i.e., the first, seventh, thirteenth packets, etc.) are NULL packets.

In this stream conversion apparatus, the packet reduction section 12 only deletes the $(6n-5)^{th}$ packets. The time stamp replacement section 13 does not perform time stamp replacement for the $(6n-4)^{th}$ packets. Therefore, the $(6n-4)^{th}$ packets are stored to the buffer 14 with the same time stamps ("779", "5453", etc.) as assigned by the time stamp assignment section On the other hand, the time stamp replacement section 13 performs time stamp replacement for the $(6n-m')^{th}$ packets (where m' is an integer which is equal to or greater than 0 and equal to or less than 3), in accordance with eq. (2). In this case, $TS \times \beta$ in eq. (2) is "903". Therefore, the time stamp assigned to every $(6n-m')^{th}$ packet (where m' is as defined above) is replaced so that the difference between itself and the time stamp assigned to the immediately previous packet equals "903". For example, the time stamp of the third packet is changed from "1558" to "1682", and the time stamp of the fourth packet is changed from "2337" to "2585". The $(6n-m')^{th}$ packets (where m' is as defined above) having undergone such time stamp replacements are stored to the buffer 14. Thereafter, the same processes as those performed by the first exemplary stream conversion apparatus will follow.

In the fourth exemplary stream conversion apparatus (see FIG. 7), the input stream 21 has a code ratio of 7/8. Accordingly, in order to satisfy eq. (3), the output rate of the output stream 23 has a maximum value Sout of 47 Mbits/s. In this stream, for an integer m which is equal to or greater than 0 and equal to or less than 7, every $(8n-m)^{th}$ packet from the beginning is a NULL packet. It is assumed herein that the $(8n-7)^{th}$ packets (i.e., the first, ninth, seventeenth packets, etc.) are NULL packets.

In this stream conversion apparatus, the packet reduction section 12 only deletes the $(8n-7)^{th}$ packets. The time stamp replacement section 13 does not perform time stamp replacement for the $(8n-6)^{th}$ packets. Therefore, the $(8n-6)^{th}$ packets are stored to the buffer 14 with the same time stamps ("779", "6232", etc.) as assigned by the time stamp assignment section 11.

On the other hand, the time stamp replacement section 13 performs time stamp replacement for the $(8n-m')^{th}$ packets (where m' is an integer which is equal to or greater than 0 and equal to or less than 5), in accordance with eq. (2). In this case, TS×β in eq. (2) is "864". Therefore, the time stamp assigned to every $(8n-m')^{th}$ packet (where m' is as defined above) is replaced so that the difference between itself and the time stamp assigned to the immediately previous packet equals "864". For example, the time stamp of the third packet is changed from "1558" to "1643", and the time stamp of the fourth packet is changed from "2337 to "2507". The $(8n-m')^{th}$ packets (where m' is as defined above) having undergone such time stamp replacements are stored to the buffer 14. Thereafter, the same processes as those performed by the first exemplary stream conversion apparatus will follow.

As described above, by using the stream conversion apparatuses according to the present embodiment, it is possible to perform a stream conversion process for input streams having different code ratios from those illustrated in the first embodiment, based on the same principle as that of the stream conversion apparatus according to the first embodiment. Accordingly, the same effects as those attained by the stream conversion apparatus according to the first embodiment can be obtained.

It will be appreciated that the input rate of the input stream 21, the output rate of the output stream 23, the frequency of the output timing signal 22, the frequency with which the time count section 17 updates its count value, etc., are not limited to the aforementioned values.

Third Embodiment

The third embodiment illustrates a stream conversion apparatus which performs a stream conversion process for an input stream which contains NULL packets appearing with a predetermined repetition pattern (hereinafter referred to as "deletable NULL packets") as well as other NULL packets (hereinafter referred to as "non-deletable NULL packets").

The stream conversion apparatus according to the present embodiment receives, as an input stream 21, an MPEG2 transport stream obtained by demodulating an analog signal which has been modulated by a QPSK scheme with a code ratio of 3/4, as in the first embodiment. In this MPEG2 transport stream, for an integer m which is equal to or greater than 0 and equal to or less than 3, every $(4n-m)^{th}$ packet from the beginning is a NULL packet. Thus, every $(4n-m)^{th}$ NULL packet from the beginning is regarded as a deletable NULL packet. In the present embodiment, it is assumed that the input stream 21 contains non-deletable NULL packets in addition to the deletable NULL packet.

The stream conversion apparatus according to the present embodiment can take either a state in which the stream conversion apparatus already knows where the deletable NULL packets in the input stream 21 are (hereinafter referred to as a "synchronized state"), or a state in which the stream conversion apparatus does not know where the deletable NULL packets in the input stream 21 are (hereinafter referred to as an "unsynchronized state"). Specifically, the stream conversion apparatus switches to an unsynchronized state if, in a synchronized state, a non-NULL packet is inputted when a deletable packet is in fact to be inputted. Conversely, the stream conversion apparatus switches to a synchronized state if, in an unsynchronized state, the number of consecutively inputted non-NULL packets reaches a maximum value (e.g., three in the case of the aforementioned MPEG2 transport stream).

In a synchronized state, the stream conversion apparatus according to the present embodiment operates in a similar manner to the stream conversion apparatus according to the first embodiment. However, if a non-deletable NULL packet is inputted in a synchronized state, the packet reduction section 12 outputs the non-deletable NULL packet to the time stamp replacement section 13 without deleting it.

In an unsynchronized state, the stream conversion apparatus according to the present embodiment subjects any inputted non-NULL packet to a process similar to that which is performed for a non-NULL packet which is inputted in a synchronized state. Also in an unsynchronized state, the stream conversion apparatus deletes any NULL packet which is inputted immediately after a non-NULL packet. If a plurality of NULL packets are consecutively inputted in an unsynchronized state, the stream conversion apparatus deletes the odd-numbered packets, while outputting the even-numbered packets, among such consecutive NULL packets.

Figure 8:
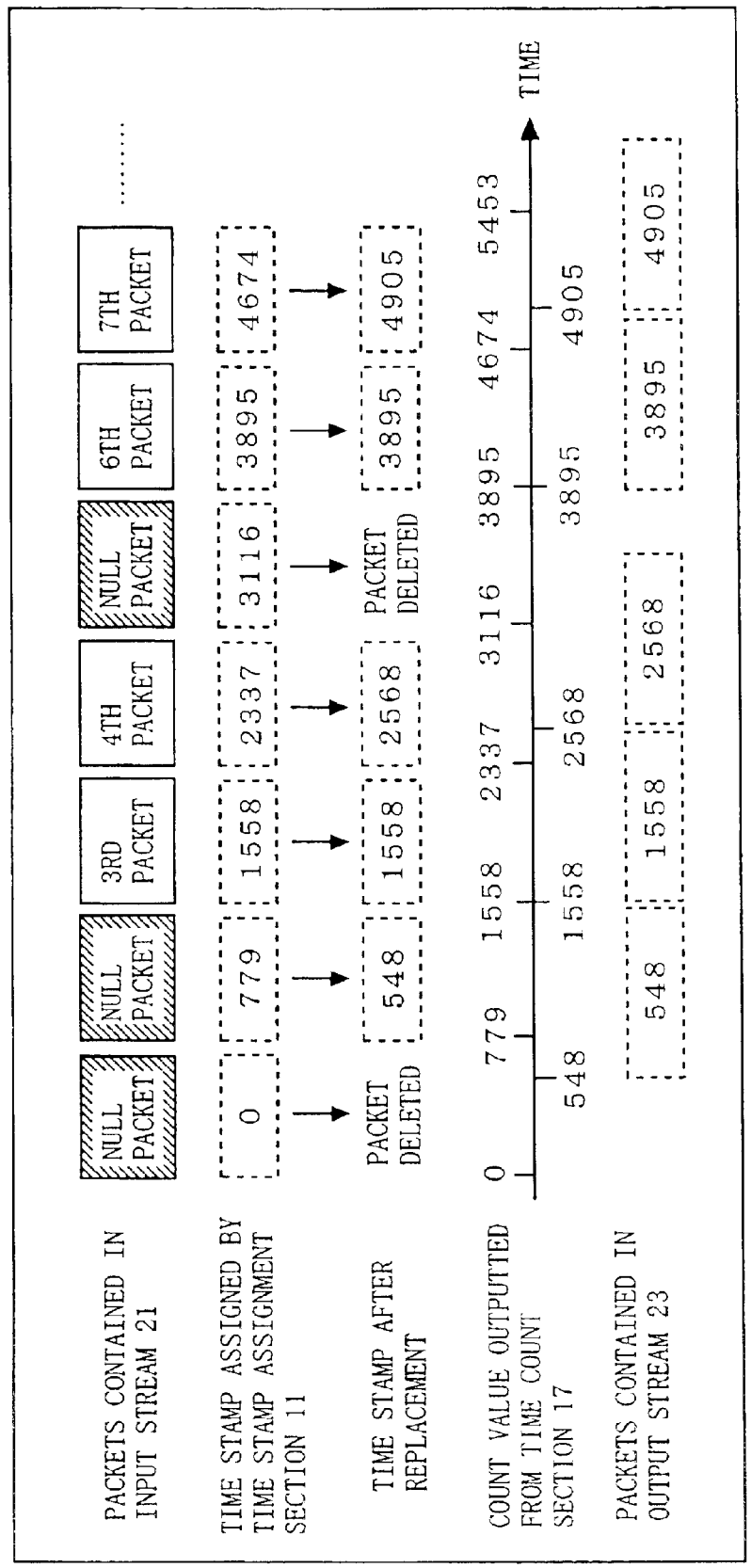
FIG. 8 is a diagram illustrating a process performed by the stream conversion apparatus according to the third embodiment of the present invention (in an unsynchronized state)
Figure 9:
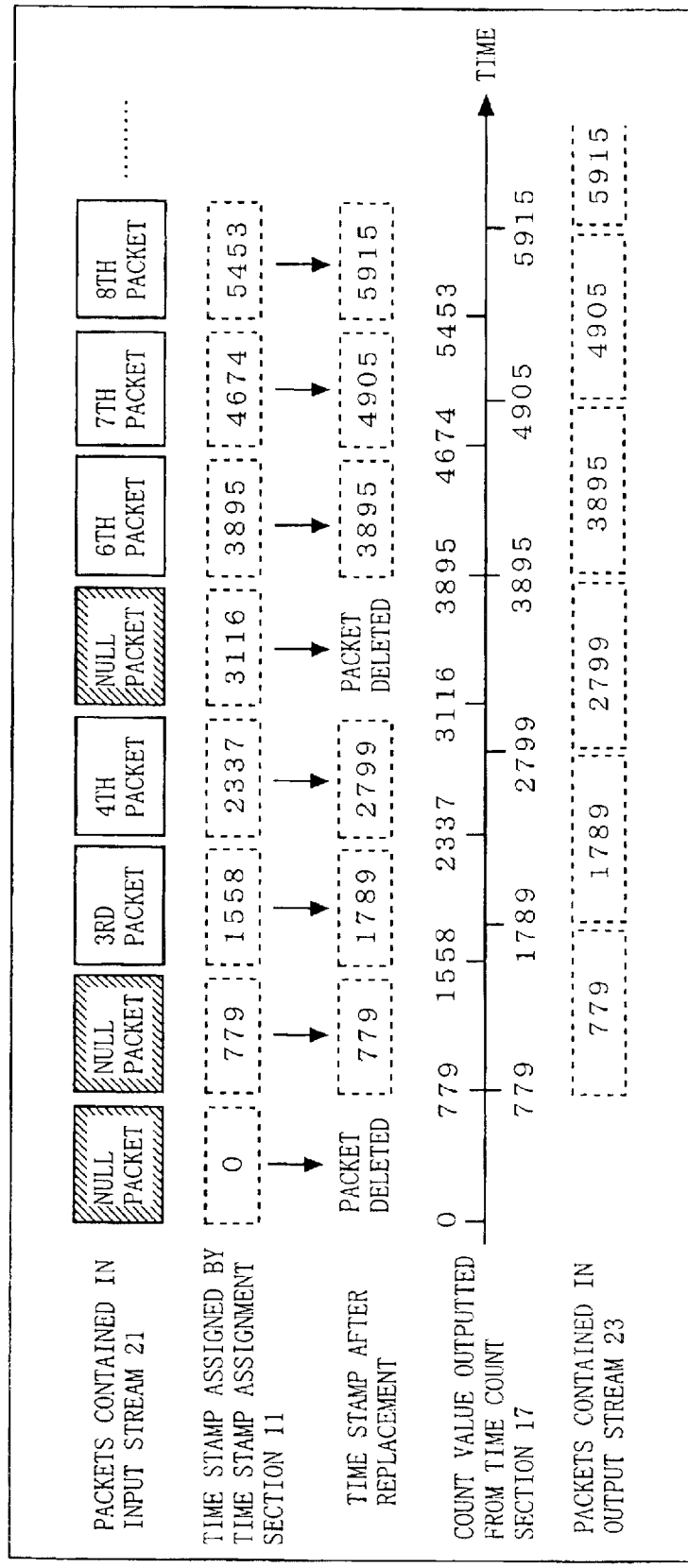
FIG. 9 is a diagram illustrating a process performed by the stream conversion apparatus according to the third embodiment of the present invention (in a synchronized state)
Figure 10:
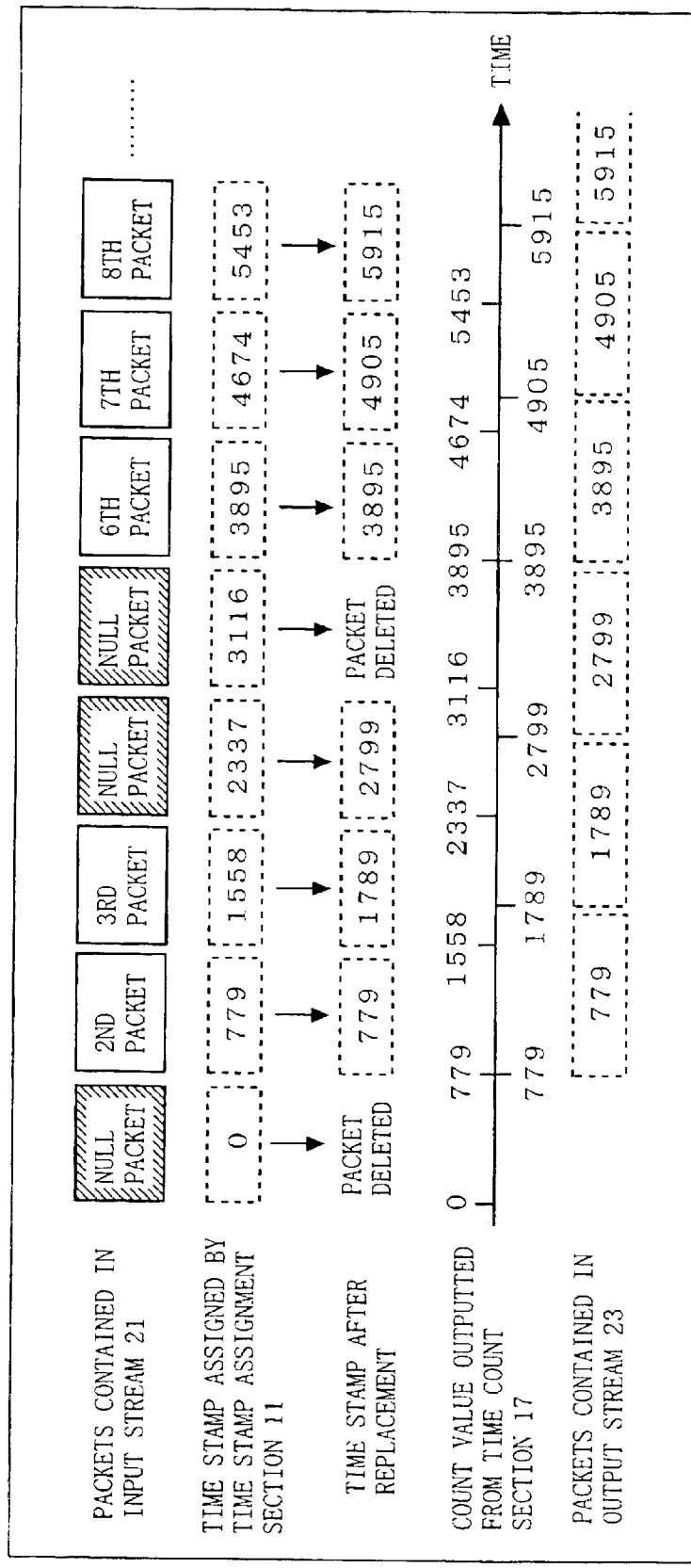
FIG. 10 is a diagram illustrating a process performed by the stream conversion apparatus according to the third embodiment of the present invention (in a synchronized state)

Hereinafter, with reference to FIGS. 8 to 10, the operation of the stream conversion apparatus according to the present embodiment will be specifically described. FIGS. 8 to 10 illustrate processes performed by the stream conversion apparatus according to the present embodiment under the same set of conditions as in FIG. 3.

FIG. 8 illustrates a process which is performed in the case where two NULL packets happen to be consecutively inputted in an unsynchronized state. In this example, the first and fifth packets are deletable NULL packets, whereas the second packet is a non-deletable NULL packet. The first and second packets are the consecutively inputted NULL packets.

As mentioned above, if consecutive NULL packets are inputted in an unsynchronized state, the stream conversion apparatus according to the present embodiment deletes the odd-numbered packets, while outputting the even-numbered packets, among such consecutive NULL packets. In the illustrated example, the first packet is in an odd-numbered position (i.e., first) among the two consecutive NULL packets, and therefore is deleted by the packet reduction section 12. On the other hand, the second packet is in an even-numbered position (i.e., second) among the two consecutive NULL packets, and therefore is not deleted by the packet reduction section 12 (although it is a NULL packet), but instead outputted from the packet reduction section 12 to the time stamp replacement section 13.

If a NULL packet is inputted in an unsynchronized state, the time stamp replacement section 13 performs a special time stamp replacement. Specifically, the time stamp replacement section 13 replaces the time stamp assigned to the NULL packet inputted in an unsynchronized state with a value TSnew which is calculated in accordance with eq. (5):

$$TSnew = TScur - \Delta TS \times (\beta - 1) \quad (5)$$

In eq. (5), TScur represents the pre-replacement value of the time stamp assigned to the packet to be processed. $\Delta TS$ and β are as defined above in connection with eq. (2).

In the example illustrated in FIG. 8, the pre-replacement value TScur of the time stamp assigned to the second packet is "779". Therefore, the time stamp assigned to the second packet is replaced with "548", which is calculated as follows.

$$TSnew=779-779\times\{(52.17\times10^6)/(40.205\times10^6)-1\}\approx548$$

Note that, due to the convenient assumption that the time stamp replacement section 13 universally applies zero ("0") as the aforementioned predetermined value TD, the example illustrated in FIG. 8 appears as if the value of the time stamp assigned to the second packet is decreased by the time stamp replacement section 13 (so that the second packet appears to have an output time which falls before its input time). In practice, however, a sufficiently large predetermined value TD is used in order to ensure that the time stamp replacement section 13 serves to increase the time stamp assigned to each packet. As a result, the output time of each packet will always fall after its input time.

The process performed for the third and subsequent packets is as follows. The third packet is a non-NULL packet in this example, and therefore is not deleted by the packet reduction section 12. Since it is not necessary to change the output timing for the third packet, the time stamp replacement section 13 does not perform time stamp replacement for the third packet. Therefore, the third packet is stored to the buffer 14 with the same time stamp ("1558") as assigned by the time stamp assignment section 11.

The fourth packet is a non-NULL packet in this example, and therefore is not deleted by the packet reduction section 12. Since the immediately previous packet (i.e., the third packet) is a non-NULL packet, the time stamp replacement section 13 performs time stamp replacement for the fourth packet in accordance with eq. (2). As a result, the time stamp assigned to the fourth packet is changed from "2337" to "2568". The fourth packet having undergone such a time stamp replacement is stored to the buffer 14.

The fifth packet is a NULL packet following immediately after a non-NULL packet, and therefore is deleted by the packet reduction section 12. The sixth and seventh packets are non-NULL packets, and therefore are not deleted by the packet reduction section 12. The time stamp replacement section 13 does not perform time stamp replacement for the sixth packet, but performs time stamp replacement for the seventh packet in accordance with eq. (2). As a result, whereas the time stamp of the sixth packet remains to be the same "3895" as assigned by the time stamp assignment section 11, the time stamp of the seventh packet is changed from "4674" to "4905". The sixth and seventh packets having undergone such time stamp replacements are stored to the buffer 14. Thereafter, the same process as that illustrated in FIG. 3 follows.

If the third packet were also a NULL packet (in addition to the first and second packets) in FIG. 8, the third packet would be deleted by the packet reduction section 12 because it would be in an odd-numbered position (i.e., third) among the three consecutive NULL packets. If the fourth packet were also a NULL packet (in addition to the first, second, and third packets), the fourth packet would not be deleted by the packet reduction section 12 because it is in an even-numbered position (i.e., fourth) among the four consecutive NULL packets, and the time stamp replacement section 13 would perform time stamp replacement for the fourth packet in accordance with eq. (5), as is the case with the second packet. On the other hand, if the fourth packet is a non-NULL packet in this case (assuming that the first, second, and third packets are NULL packets), the fourth packet is not deleted by the packet reduction section 12, and the time stamp replacement section 13 does not perform time stamp replacement for the fourth packet, as is the case with the third packet illustrated in FIG. 8.

FIG. 9 illustrates a process which is performed in the case where two NULL packets happen to be consecutively inputted in a synchronized state. In this example, the first and fifth packets are deletable NULL packets, and the second packet is a non-deletable NULL packet. The first and second packets are the consecutively inputted NULL packets. It is further assumed that the stream conversion apparatus already knows that the $(4n-3)^{th}$ packets are deletable NULL packets.

As mentioned above, if a non-deletable NULL packet is inputted to the stream conversion apparatus according to the present embodiment in a synchronized state, the packet reduction section 12 outputs the non-deletable NULL packet to the time stamp replacement section 13 without deleting it. In the example illustrated in FIG. 9, the second packet is a non-deletable NULL packet which is inputted in a synchronized state. Therefore, the second packet is not deleted by the packet reduction section 12, and treated as if a non-NULL packet. The second packet is a packet following immediately after a deletable NULL packet (i.e., the first packet). Hence, the time stamp replacement section 13 does not perform time stamp replacement for the second packet. Therefore, the second packet is stored to the buffer 14 with the same time stamp ("779") as assigned by the time stamp assignment section 11. Thereafter, the same process as that illustrated in FIG. 3 follows.

FIG. 10 illustrates a process which is performed in the case where two NULL packets happen to be consecutively inputted in a synchronized state. In this example, the first and fifth packets are deletable NULL packets, and the fourth packet is a non-deletable NULL packet. The fourth and fifth packets are the consecutively inputted NULL packets. It is further assumed that the stream conversion apparatus already knows that the $(4n-3)^{th}$ packets are deletable NULL packets.

The fourth packet is a non-deletable NULL packet, and therefore is not deleted by the packet reduction section 12, and treated as if a non-NULL packet. The fourth packet is a packet following immediately after a non-NULL packet (i.e., the third packet). Therefore, the time stamp replacement section 13 performs time stamp replacement for the fourth packet in accordance with eq. (2), so that the time stamp of the fourth packet is changed from "2337" to "2799". The fourth packet having undergone such a time stamp replacement is stored to the buffer 14. Thereafter, the same process as that illustrated in FIG. 3 follows.

Figure 11:
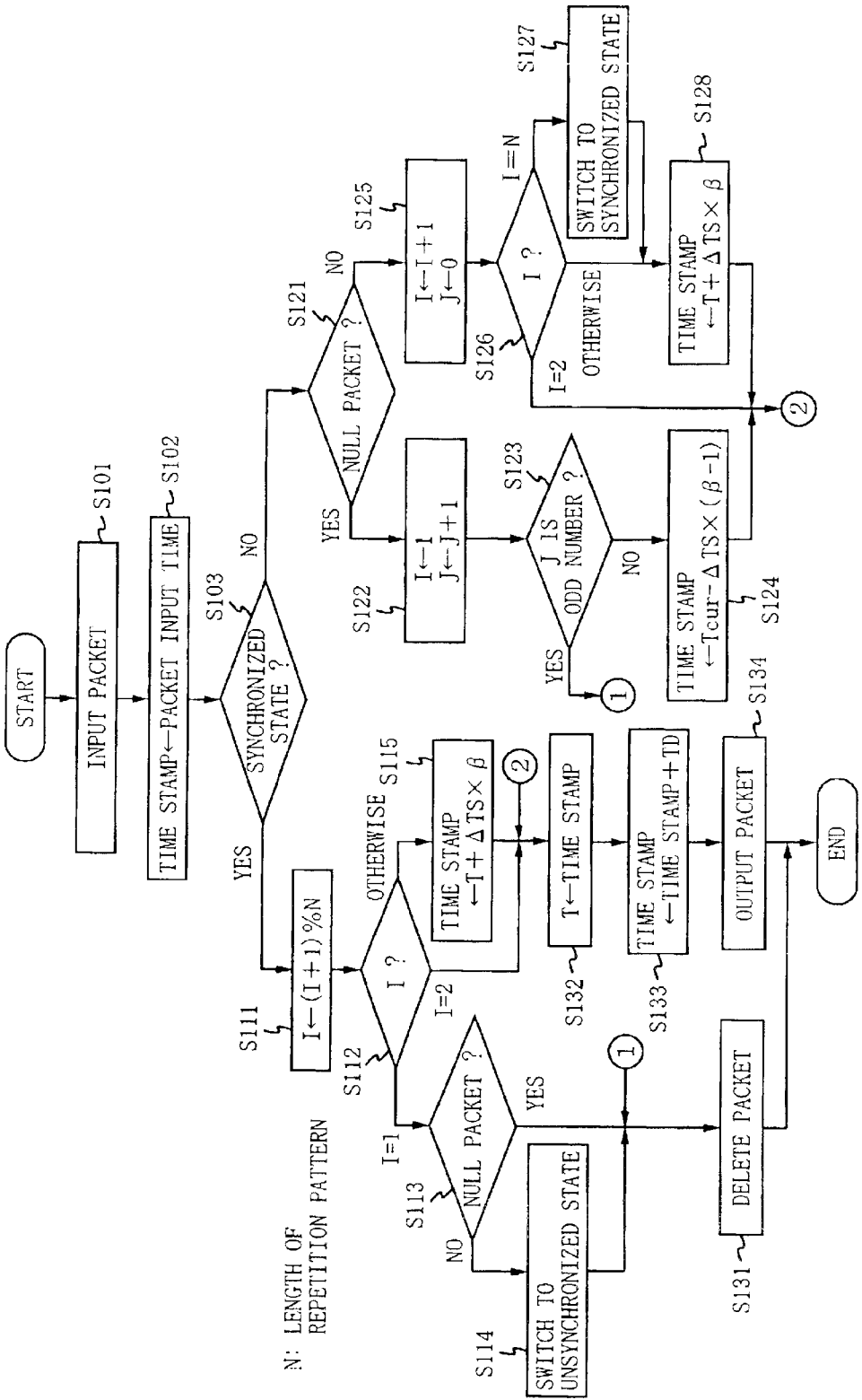
FIG. 11 is a flowchart illustrating a process performed by the stream conversion apparatus according to the third embodiment of the present invention.

Hereinafter, with reference to the flowchart shown in FIG. 11, the process performed by the stream conversion apparatus according to the present embodiment will be further described. FIG. 11 is a flowchart illustrating a process performed by the stream conversion apparatus according to the present embodiment. The process shown in FIG. 11 is performed for each packet in the input stream 21. In the process shown in FIG. 11, four values N, I, J, and T are used. N represents the length of the predetermined repetition pattern contained in the input stream 21 (e.g., "4" in the case where the code ratio is 3/4). I represents the ordinal position of a given inputted packet in the predetermined repetition pattern contained in the input stream 21. J represents the number of consecutive NULL packets inputted in an unsynchronized state. T represents the time stamp assigned to an immediately previously outputted packet.

The process of FIG. 11 begins when a single packet in the input stream 21 is inputted to the time stamp assignment section 11 (step S101). As a time stamp to the inputted packet, the time stamp assignment section 11 assigns the input time of that packet (step S102). Next, it is determined whether the stream conversion apparatus is in a synchronized state or not (step S103). If the stream conversion apparatus is in a synchronized state, the process of step S111 and subsequent steps is performed. If the stream conversion apparatus is in an unsynchronized state, the process of step S121 and subsequent steps is performed.

In a synchronized state (following the "YES" path from step S103), the remainder of the division (I+1)/N (where N is the length of the repetition pattern) is substituted for 1 (step S111). Depending on the value of I as calculated at step S111, the subsequent process generally branches out into three paths (step S112). If the value of I as calculated at step S111 is "1", it is indicated that the inputted packet is in the position of a NULL packet to be deleted, and therefore control proceeds to step S113. In this case, it is determined whether the inputted packet is in fact a NULL packet or not (step S113). If the packet is not a NULL packet, the stream conversion apparatus switches to an unsynchronized state (step S114). Regardless of the result of the determination of step S113, the packet which is indicated to be in the position of a NULL packet to be deleted is deleted by the packet reduction section 12 (step S131).

If the value of I as calculated at step S111 is "2", the position of the inputted packet is determined to be immediately after a NULL packet to be deleted, and control proceeds to step S132. In this case, the time stamp replacement section 13 does not perform time stamp replacement for this packet.

If the value of I as calculated at step S111 is neither "1" nor "2", the position of the inputted packet is determined to be immediately after a packet which is not to be deleted, and control proceeds to step S115. In this case, the time stamp replacement section 13 performs time stamp replacement in accordance with eq. (2) (step S115). This calculation according to eq. (2) refers to the value of T for the time stamp assigned to the packet which was immediately previously outputted. Then, control proceeds to step S132.

At step S132, the time stamp which is currently assigned to the inputted packet is stored to T so that this value can be referred to in the process for the next inputted packet. Next, the time stamp replacement section 13 adds a predetermined value TD to the time stamp which is currently assigned to the inputted packet in order to ensure that the output time of the output stream 23 falls after the input time of the input stream 21 (step S133). Then, the packet which was inputted at step S101 is outputted (step S134). Note that the outputting at step S134 refers to the outputting of the packet from the output section 16 (through the time stamp replacement section 13, the buffer 14, and the packet reading section 15), as completed at a time indicated by the time stamp assigned to that packet.

In an unsynchronized state (following the "NO" path from step S103), it is determined whether the inputted packet is a NULL packet (step S121). Depending on the result of the determination of step S121, the subsequent process generally branches out into two paths. If the inputted packet is a NULL packet (following the "YES" path from step S121), I is initialized to "1", and J is incremented by one (step S122). Then, it is determined whether the value of J is an odd number or an even number (step S123).

If the value of J as calculated at step S122 is an odd number (following the "YES" path from step S123), the inputted packet is determined to be in an odd-numbered position among consecutive NULL packets, the stream conversion apparatus having been determined to be in an unsynchronized state. In this case, control proceeds to step S131, where the inputted packet is deleted by the packet reduction section 12 (step S131).

On the other hand, if the value of J as calculated at step S122 is an even number (following the "NO" path from step S123), the inputted packet is determined to be in an even-numbered position among consecutive NULL packets, the stream conversion apparatus having been determined to be in an unsynchronized state. In this case, the time stamp replacement section 13 performs a special time stamp replacement for the inputted packet in accordance with eq. (5) (step S124).

If the inputted packet is a non-NULL packet (following the "NO" path from step S121), J is initialized to "0", and I is incremented by one (step S125). Depending on the value of I as calculated at step S125, the subsequent process generally branches out into three paths (step S126). If the value of I as calculated at step S125 is equal to N (i.e., the length of the repetition pattern), the stream conversion apparatus switches to a synchronized state (step S127). If the value of I as calculated at step S125 is not two, the time stamp replacement section 13 performs time stamp replacement for the inputted packet in accordance with eq. (2) (step S128).

After step S124 or S128 is executed, or directly after determining at step S126 that the value of I as calculated at step S125 is "2", control proceeds to step S132. In the process of step S132 and subsequent steps, the time stamp which is currently assigned to the inputted packet is stored to T, and the value TD is added to the time stamp. Thereafter, the packet which was inputted at step S101 is outputted to outside of the apparatus by means of the buffer 14, the packet reading section 15, and the output section 16.

Thus, the stream conversion apparatus according to the present embodiment features processes to be performed in an unsynchronized state, in addition to the functions of the stream conversion apparatus according to the first embodiment. This additional feature makes it possible to perform a stream conversion process for an input stream containing NULL packets other than deletable NULL packets. As a result, similar effects to those attained by the stream conversion apparatus according to the first embodiment are provided.

Fourth Embodiment

The fourth embodiment illustrates a stream conversion apparatus which replaces PCRs contained in the input stream in addition to performing the above-described time stamp replacements. A PCR may be contained in a packet of an input stream 21 as information to be used for calibrating the values which serve as time references for a decoder of video or audio streams. For example, a transport packet contained in an MPEG2 transport stream contains a PCR in its adaptation field. This PCR is used for adjusting a time reference (referred to as "STC (System Time Clock)") to be used by a decoder of the transport stream to a value which is intended by an encoder.

In the stream conversion apparatus according to the present embodiment, the time stamp replacement section 13 performs PCR replacements based on the same set of calculations as that used for the above-described time stamp replacements. More specifically, in the present embodiment, the time count section 17 produces a count value which is updated with a frequency of 27 MHz. Such a time count section 17 can be composed of, for example, a counter which counts the pulses of a clock signal having a frequency of 27 MHz. If any packet outputted from the packet reduction section 12 contains a PCR, the time stamp replacement section 13 adds a difference between the pre-replacement value and the post-replacement value of the time stamp assigned to the packet to the PCR contained in the packet. Thus, PCR replacements can be realized by means of a simple structure, without the need to employ a special circuit.

Figure 12:
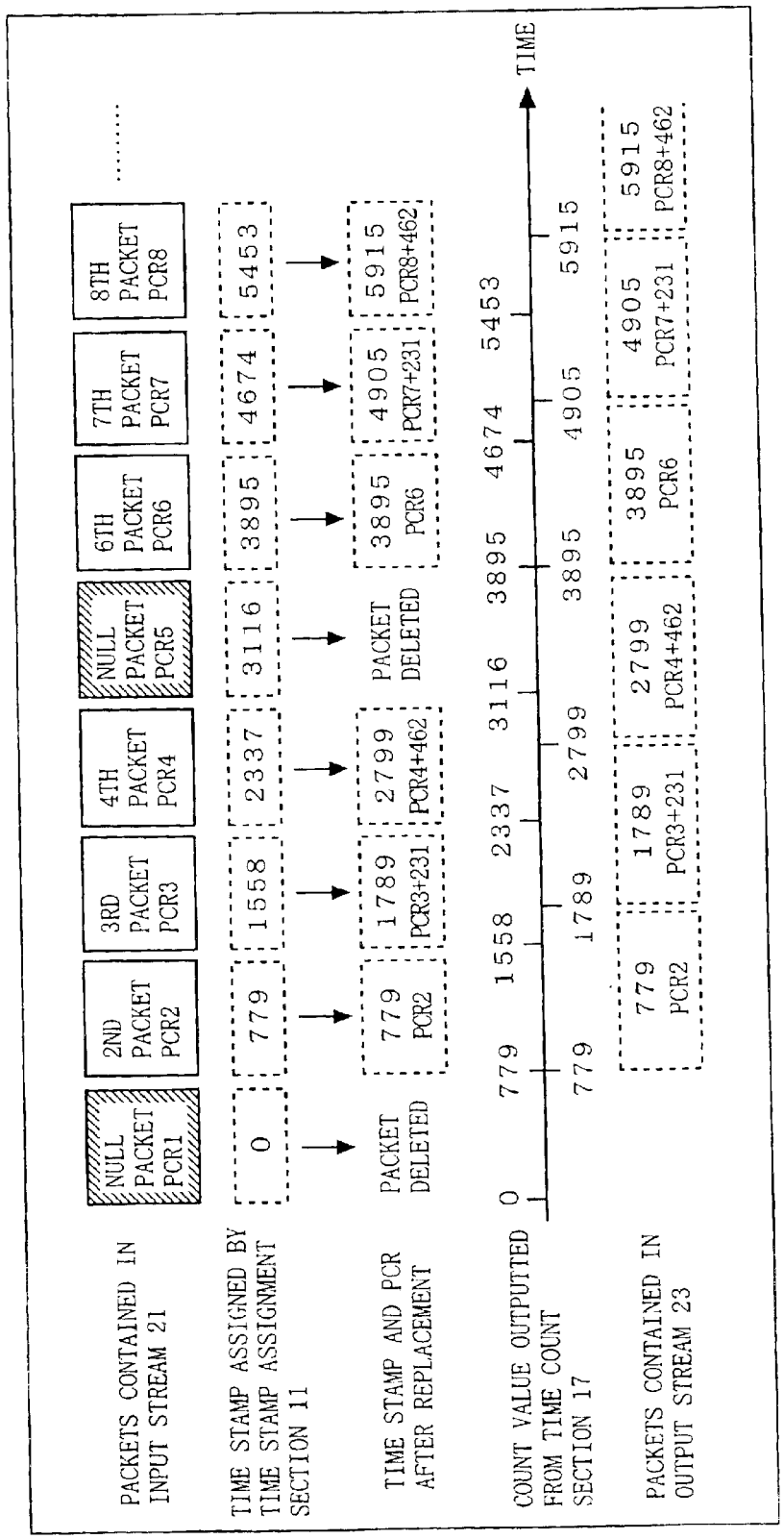
FIG. 12 is a diagram illustrating a process performed by the stream conversion apparatus according to the fourth embodiment of the present invention.
Figure 13:
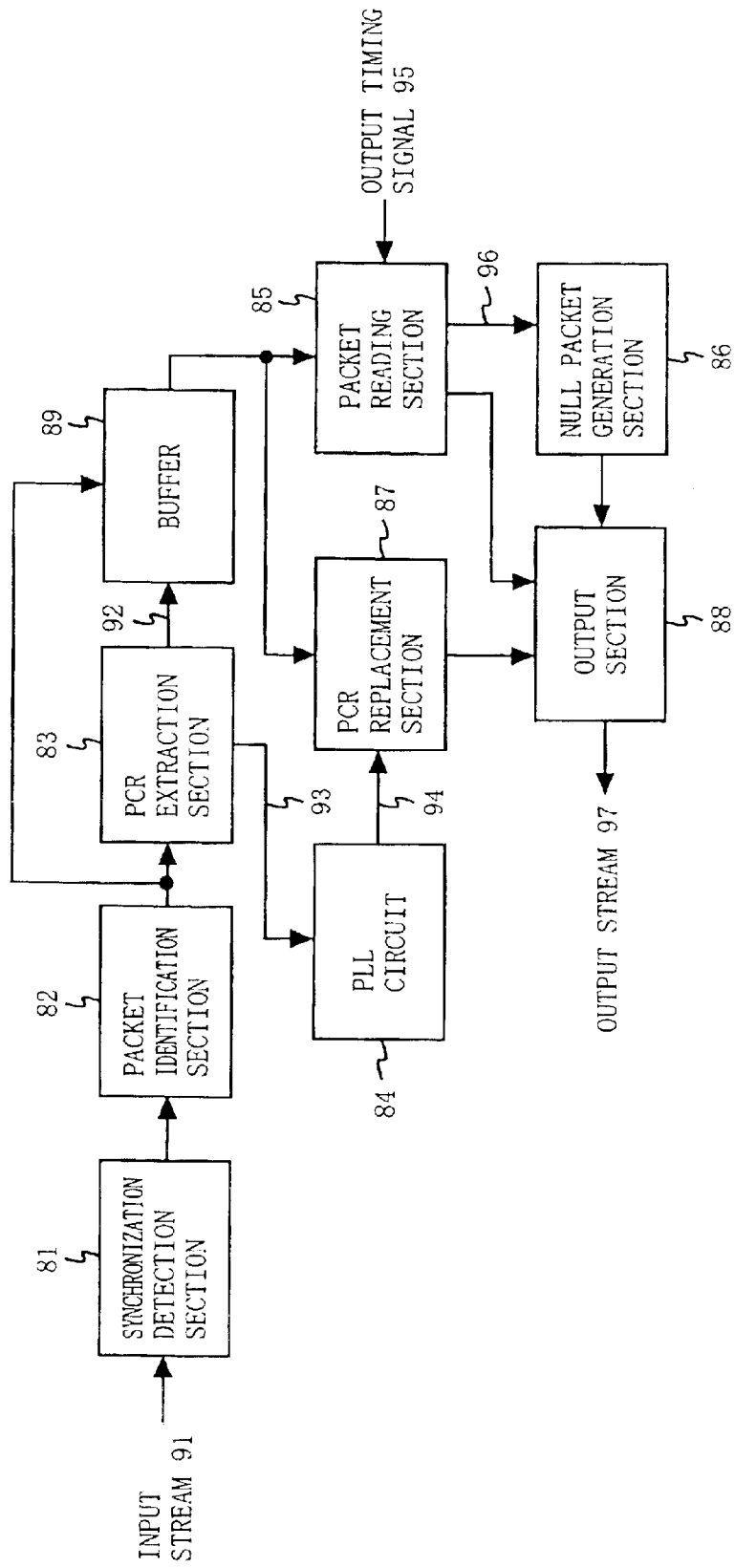
FIG. 13 is a block diagram illustrating the structure of a conventional stream conversion apparatus.

FIG. 12 is a diagram illustrating a process performed by the stream conversion apparatus according to the fourth embodiment of the present invention. Specifically, FIG. 12 illustrates a process performed by the stream conversion apparatus according to the present embodiment under the same set of conditions as in FIG. 3, except that some of the packets in the input stream supplied to the stream conversion apparatus contain PCRs. The first row of FIG. 12 shows that the first to eighth packets each contain a PCR (PCR 1 to PCR 8).

Among the eight packets shown in the example illustrated in FIG. 12, the first and fifth packets are NULL packets, and therefore are deleted by the packet reduction section 12. The remaining six packets, which are non-NULL packets, are outputted from the packet reduction section 12 to the time stamp replacement section 13 without being deleted by the packet reduction section 12.

The time stamp replacement section 13 does not replace the time stamp of any packet following immediately after a deleted packet, but performs time stamp replacement for any other packet in accordance with eq. (2). As a result, the time stamps assigned to the second and sixth packets are not changed; on the other hand, the time stamps assigned to the third and seventh packets are each increased by "231", and the time stamps assigned to the fourth and eighth packets are each increased by "462".

The time stamp replacement section 13 also applies the same time stamp increment to the PCR contained in each packet. As a result, the PCRs contained in the second and sixth packets are not changed; on the other hand, the PCRs contained in the third and seventh packets are each increased by "231", and the PCRs contained in the fourth and eighth packets are each increased by "462". Thus, packets which have undergone not only time stamp replacements but also PCR replacements are stored to the buffer 14. Thereafter, the same processes as those illustrated with respect to FIG. 3 will follow.

As described above, in the stream conversion apparatus according to the present embodiment, the time stamp replacement section performs PCR replacements based on the same set of calculations as that used for the time stamp replacements, thereby making it unnecessary to employ a special PCR replacement circuit, which was a necessity in a conventional stream conversion apparatus. Since the PCR replacements performed by the time stamp replacement section are based on the values derived for the time stamp replacements, the PCR replacements can be realized through simple calculations. Furthermore, since PCRs are updated through digital calculations, various problems are forestalled, e.g., errors occurring during the execution of the calculations, inability to continue calculations due to instability of the circuitry, or calculation errors.

Although the time stamps processed by the stream conversion apparatuses according to the first to fourth embodiments are illustrated as having integer values, the time stamps may include a decimal portion having a predetermined number of digits. By employing time stamps including a decimal portion, the accuracy of output timing in each stream conversion apparatus can be enhanced.

The first to fourth embodiments illustrate examples where, in order to ensure that the output time of the output stream 23 is delayed with respect to the input time of the input stream 21, the time stamp replacement section 13 universally adds a predetermined value TD to the time stamp assigned to any packet which is outputted from the packet reduction section 12. However, such additions may instead be handled by the time stamp assignment section 11. Alternatively, instead of employing the time stamp assignment section 11 or the time stamp replacement section 13 to carry out such additions, the packet reading section 15 may simply be conditioned to read a packet out of the buffer 14 only when the sum of the predetermined value TD and the time stamp assigned to that packet as stored in the buffer 14 becomes equal to the count value provided by the time count section 17.

The flowchart of FIG. 11, which has been used to described the process performed by the stream conversion apparatus according to the third embodiment, can also be used to describe the processes performed by the stream conversion apparatuses according to the other embodiments. Specifically, the process performed by the stream conversion apparatus according to the first or second embodiment corresponds to the portion of the flow of FIG. 11 concerning a synchronized state. The process performed by the stream conversion apparatus according to the fourth embodiment can be obtained by additionally introducing PCR replacement processes at step S115, S124, and S128 in FIG. 11 using the same set of calculations as the time stamp replacements.

Furthermore, a program for causing a computer to perform the stream conversion method as realized by the stream conversion apparatus according to each of the first to fourth embodiments may be prepared, and each embodiment of the present invention can be implemented by using such a program and a computer. In this case, the program thus prepared may be recorded on a computer-readable recording medium, which may then be fed to a computer that executes the program to implement each embodiment of the present invention.

While the invention has been described in detail, the foregoing description is in all aspects illustrative and not restrictive. It is understood that numerous other modifications and variations can be devised without departing from the scope of the invention.

What is claimed is:

1. A digital stream conversion apparatus for outputting a digital stream having a packetized format at a rate which is slower than an input rate, comprising:

a time stamp assignment section for assigning, as a time stamp for each packet in an inputted digital stream comprising a plurality of packets, an input time of the packet;

a packet reduction section for deleting deletable packets from the inputted digital stream and outputting remaining packets, wherein the deletable packets are packets which appear in the digital stream with a predetermined repetition pattern;

a time stamp replacement section for, based on a proportion of the deletable packets in the digital stream, replacing the time stamps assigned to the packets outputted from the packet reduction section; and a packet output section for outputting the packets outputted from the time stamp replacement section, such that each packet is outputted at a time indicated by the time stamp assigned to the packet.

2. The digital stream conversion apparatus according to claim 1, wherein, until positions of the deletable packets among the packets outputted from the time stamp assignment section are ascertained, the packet reduction section is operable to:

if a packet of the same type as the deletable packets is inputted following immediately after a packet of a different type from the type of the deletable packets, delete the packet; and if packets of the same type as the deletable packets are consecutively inputted, delete any packet in an odd-numbered position among the consecutive packets and output any packet in an even-numbered position among the consecutive packets.

3. The digital stream conversion apparatus according to claim 1, wherein, once the positions of the deletable packets among the packets outputted from the time stamp assignment section are ascertained, the packet reduction section is operable to delete any packets which are in the ascertained positions, and output the remaining packets in the inputted digital stream, regardless of whether the remaining packets are of the same type as the deletable packets or not.

4. The digital stream conversion apparatus according to claim 1, wherein the deletable packets account for a proportion $\alpha$ of all the packets in the inputted digital stream (where $0<\alpha<1$), and the time stamp replacement section does not perform time stamp replacement for any packet following immediately after a deletable packet, but performs time stamp replacement for any other packet so that a difference between the time stamp assigned to the packet and the time stamp assigned to an immediately previous packet is $\beta$ times as large as that before the time stamp replacement (where $1<\beta<1/(1-\alpha)$).

5. The digital stream conversion apparatus according to claim 1, wherein the time stamp assignment section and the packet output section each use a count value of pulses of a clock signal having a predetermined frequency as a reference of time.

6. The digital stream conversion apparatus according to claim 1, wherein, the digital stream is a transport stream compliant with the MPEG2 system standard, and the packet reduction section regards null packets which appear in the transport stream with a predetermined repetition pattern as the deletable packets.

7. The digital stream conversion apparatus according to claim 6, wherein the time stamp assignment section and the packet output section each use, as a reference of time, a count value which is updated with a frequency of 27 MHz, and if any packet outputted from the packet reduction section contains a program clock reference, the time stamp replacement section adds to the program clock reference contained in the packet a difference between the time stamp assigned to the packet before the time stamp replacement and that assigned after the time stamp replacement.

8. The digital stream conversion apparatus according to claim 1, wherein the digital stream is a stream obtained by demodulating an analog signal which has been modulated by a QPSK scheme with a code ratio selected from the group consisting of 7/8, 5/6, 3/4, 2/3, and 1/2.

9. The digital stream conversion apparatus according to claim 1, wherein the digital stream is a stream obtained by demodulating an analog signal which has been modulated by a BPSK scheme with a code ratio of 1/2.

10. A digital stream conversion method for outputting a digital stream having a packetized format at a rate which is slower than an input rate, comprising:

a time stamp assignment step of assigning, as a time stamp for each packet in an inputted digital stream comprising a plurality of packets, an input time of the packet;

a packet reduction step of deleting deletable packets from the inputted digital stream, wherein the deletable packets are packets which appear in the digital stream with a predetermined repetition pattern;

a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet.

11. A program for causing a computer to execute a digital stream conversion method for outputting a digital stream having a packetized format at a rate which is slower than an input rate, the method comprising:

a time stamp assignment step of assigning, as a time stamp for each packet in an inputted digital stream comprising a plurality of packets, an input time of the packet;

a packet reduction step of deleting deletable packets from the inputted digital stream, wherein the deletable packets are packets which appear in the digital stream with a predetermined repetition pattern;

a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet.

12. A computer-readable recording medium having recorded thereon a program for causing a computer to execute a digital stream conversion method for outputting a digital stream having a packetized format at a rate which is slower than an input rate, the method comprising:

a time stamp assignment step of assigning, as a time stamp for each packet in an inputted digital stream comprising a plurality of packets, an input time of the packet;

a packet reduction step of deleting deletable packets from the inputted digital stream, wherein the deletable packets are packets which appear in the digital stream with a predetermined repetition pattern;

a time stamp replacement step of, based on a proportion of the deletable packets in the digital stream, replacing the time stamps assigned to the packets which have not been deleted by the packet reduction step; and a packet output step of outputting the packets which have been processed by the time stamp replacement step, such that each packet is outputted at a time indicated by the time stamp assigned to the packet.

* * * * *

UNITED STATES PATENT AND TRADEMARK OFFICE
CERTIFICATE OF CORRECTION

PATENT NO. : 6,806,818 B2
DATED : October 19, 2004
INVENTOR(S) : Kouichi Kita et al.

It is certified that error appears in the above-identified patent and that said Letters Patent is hereby corrected as shown below:

Title page,
Item [*] Notice, should read
-- Subject to any disclaimer, the term of this patent is extended or adjusted under 35 U.S.C. 154(b) by 0 days. --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,806,818 B2
DATED : October 19, 2004
INVENTOR(S) : Kouichi Kita et al.

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C. 154(b) by 0 days. This patent is subject to a terminal disclaimer." should be changed to -- Subject to any disclaimer, the term of this patent is extended or adjusted under 35 U.S.C. 154(b) by 0 days. --

Signed and Sealed this

Seventh Day of June, 2005

JON W. DUDAS
*Director of the United States Patent and Trademark Office*